(12) United States Patent
Bagsby

(10) Patent No.: US 7,568,020 B2
(45) Date of Patent: *Jul. 28, 2009

(54) OPERATIONAL SUPPORT SYSTEM FOR TELECOMMUNICATION SERVICES

(75) Inventor: Denis L. Bagsby, Waterloo, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 740 days.

This patent is subject to a terminal disclaimer.

(21) Appl. No.: 10/402,361

(22) Filed: Mar. 31, 2003

(65) Prior Publication Data

US 2004/0192205 A1    Sep. 30, 2004

(51) Int. Cl.
G06F 15/173 (2006.01)
G06F 3/00 (2006.01)

(52) U.S. Cl. ...................... 709/223; 719/330

(58) Field of Classification Search ......... 709/201–206, 709/217–219, 223, 226, 246; 719/330, 315
See application file for complete search history.

(56) References Cited

U.S. PATENT DOCUMENTS

| | | | | |
|---|---|---|---|---|
| 5,566,235 A * | 10/1996 | Hetz | ...................... | 379/221.02 |
| 5,878,219 A * | 3/1999 | Vance et al. | ................ | 709/217 |
| 6,249,578 B1 | 6/2001 | Gilles et al. | ............ | 379/207.13 |
| 6,266,401 B1 | 7/2001 | Marchbanks et al. | ........ | 379/116 |
| 6,314,172 B1 | 11/2001 | Nightingale | ........... | 379/201.12 |
| 6,317,438 B1 | 11/2001 | Trebes, Jr. | ................... | 370/466 |
| 6,487,285 B2 | 11/2002 | Gilles et al. | ............ | 379/207.13 |
| 6,519,606 B2 | 2/2003 | Burton et al. | ................ | 707/103 |
| 6,523,027 B1 | 2/2003 | Underwood | .................... | 707/4 |
| 6,625,651 B1 * | 9/2003 | Swartz et al. | ................ | 709/226 |
| 7,143,420 B2 * | 11/2006 | Radhakrishnan | ............ | 719/328 |
| 2003/0086536 A1 * | 5/2003 | Salzberg et al. | .......... | 379/15.02 |
| 2003/0105884 A1 * | 6/2003 | Upton | ......................... | 709/318 |
| 2004/0201611 A1 * | 10/2004 | Bagsby | ....................... | 345/733 |
| 2005/0015771 A1 * | 1/2005 | Bagsby | ....................... | 718/106 |
| 2005/0091663 A1 * | 4/2005 | Bagsby | ....................... | 719/315 |
| 2006/0059107 A1 * | 3/2006 | Elmore et al. | .................. | 705/64 |

OTHER PUBLICATIONS

Center for Advanced Software Systems Integration, printed from Ohio University website, dated Sep. 29, 2000.*
"Using EDI with Microsoft BizTalk Server 2002", Microsoft Corporation, Feb. 2002.*
"Microsoft BizTalk for MQSeries White Paper", Microsoft Corporation, Jul. 2002.*

* cited by examiner

Primary Examiner—Yasin M Barqadle
(74) Attorney, Agent, or Firm—Toler Law Group

(57) ABSTRACT

In a particular embodiment, the disclosure is directed to a distributed communications system for use in support of telecommunication operations. The distributed computer system includes a telecommunications related application service and an integration service. The telecommunications related application service has access to a plurality of interconnection services and a plurality of different computing nodes. The integration service is coupled to the telecommunications related application services. The integration service is also coupled to a plurality of distributed resource systems. The integration service has access to at least one of the plurality of distributed resource systems in response to a communication transmitted to at least one of the plurality of interconnection services.

15 Claims, 39 Drawing Sheets

OPERATIONAL SUPPORT SYSTEM FOR TELECOMMUNICATION SERVICES

TECHNICAL FIELD

This disclosure in general relates to an operational support system for telecommunication services.

BACKGROUND

Changes in the laws relating to the telecommunications industry have required certain telephone companies to provide shared access to common telecommunications resources. Often, a single company manages these common telecommunications resources. As a result, this single company provides access to operational support systems to various competitors, customers, consumers, and vendors. However, the current operational support systems are often single-purpose, inflexible systems that are costly to maintain or enhance. In addition, many companies have multiple telecommunications resources supported by many different single-purpose systems for differing regions. Sharing these resources is complicated by the need to support multiple access protocols and diverse resource support systems. In one example, regional laws require that competitive local exchange carriers (CLEC) be given access to operational support systems managed by incumbent local exchange carriers (ILEC) to provide billing, fulfillment, and assurance support.

Sharing resources is further complicated by mergers and acquisitions of local exchange carriers. With a merger or acquisition, the surviving local exchange carrier faces the problem of supporting multiple diverse legacy systems performing similar functions, or investing considerable capital to replace or standardize the various operational support systems.

As such, many problems exist in providing access to operational support systems. Accordingly, there is a need for improved computer systems for telecommunications operational support.

SUMMARY

In a particular embodiment, the disclosure is directed to a distributed communications system for use in support of telecommunication operations. The distributed computer system includes a telecommunications related application service and an integration service. The telecommunications related application service has access to a plurality of interconnection services and a plurality of different computing nodes. The integration service is coupled to the telecommunications related application service. The integration service is also coupled to a plurality of distributed resource systems. The integration service has access to at least one of the plurality of distributed resource systems in response to a communication transmitted to at least one of the plurality of interconnection services.

In another embodiment, the disclosure is also directed to a distributed computer system for use in connection with telecommunication subscriber address validation. The distributed computer system includes an interconnection service accessible from distributed computing elements, an adaptor, a location information management service, and a plurality of resource systems. The adaptor is coupled to the interconnection service and the location information management service. The location information management service has access to at least one of the plurality of resource systems to acquire a subscriber address validation in response to an address validation request received by the interconnection service via the adaptor.

In a further embodiment, the disclosure is directed to a computer system for use in support of telecommunications channel facility assignment. The distributed computer system includes an interconnection service, an adaptor coupled to the interconnection service, a resource management integration service coupled to the adaptor, and a plurality of distributed resource systems. The resource management integration service requests channel facility assignment by at least one of the plurality of distributed resource systems in response to a channel assignment request communicated through the interconnection service and via the adaptor.

In an additional embodiment, the disclosure is directed to a method for performing telecommunication subscriber address validation. The method includes the steps of receiving an address validation request, adapting the address validation request, communicating the adapted address validation request, and accessing a resource system. The address validation request is received at an interconnection service. An adaptor adapts the address validation request to produce an adapted address validation request. The adapted address validation request is communicated to a location information management integration service. A resource system associated with the stored address information of the telecommunication subscriber is accessed. The method may further include communicating an address validation response from the location information management integration service to the adaptor. The method may also include adapting the address validation response with the adaptor to produce an adapted address validation response. The method may also include communicating the adapted address validation response using the interconnection service.

The disclosure is also directed to a method for performing a channel facility assignment. The method includes receiving a channel facility assignment request at an interconnection server, adapting the channel facility assignment request with an adaptor to produce an adapted channel facility assignment request, communicating the adapted channel facility assignment request to a resource management integration service, and accessing a resource system associated with a channel facility corresponding to the channel facility assignment request. The method may further include communicating a channel facility assignment response from the resource management integration service to the adaptor. The method may also include adapting the channel facility assignment response with the adaptor to produce an adapted channel facility assignment response and communicating the adapted channel facility assignment response using the interconnection service.

BRIEF DESCRIPTION OF THE DRAWINGS

The use of the same reference symbols in different drawings indicates similar or identical items.

DESCRIPTION OF THE DRAWINGS

An enterprise integration architecture system is described that enables a diverse set of access systems to communicate with a diverse set of resource systems through a common integrated system architecture. The enterprise integration architecture provides a common framework that can be leveraged when integrating a diverse set of telecommunications technologies and vendor equipment. Efficient and accurate data communications are provided using various exemplary embodiments of enterprise integration architectures, business integration services, adaptors, common integration busses, or common network resources.

Figure 1:
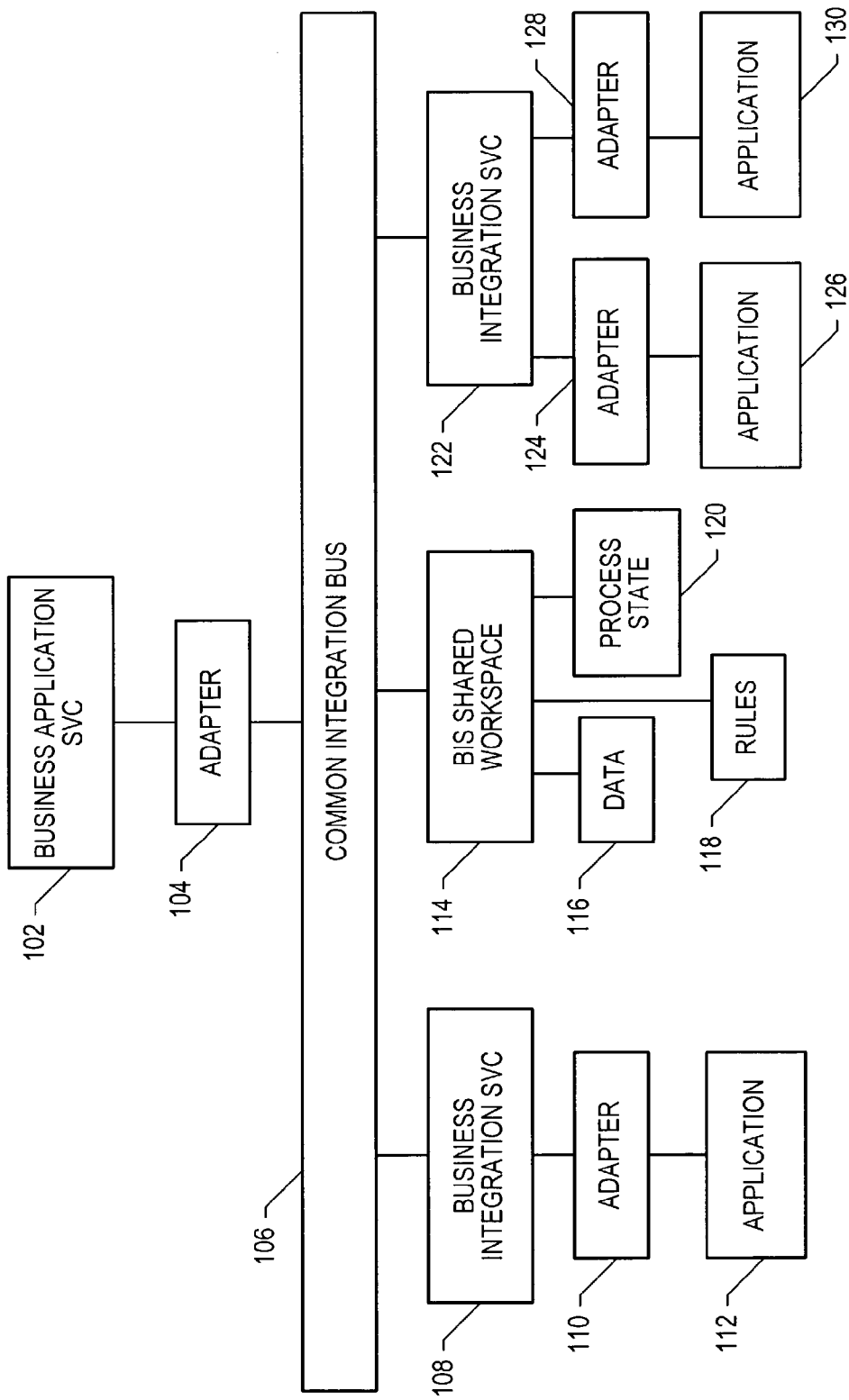
FIGS. 1, 2, 3 and 4 depict exemplary embodiments of an enterprise integration architecture.

FIG. 1 depicts a particular embodiment of an enterprise integration architecture. The architecture includes a business application service 102 in communication with a common integration bus 106 through an adaptor 104. In addition, a business integration service 108, a business integration service shared workspace 114, and a business integration service 122 are connected to the common integration bus 106.

The business application service 102 may take the form of one or more servers and may, for example, include client applications that request services of the business integration services 108 and 122, and the business integration service shared workspace 114. Users may use the business application service 102 to access various data and perform various functions associated with the business integration services tier including the business integration services 108 and 122, and the business integration service shared workspace 114. In turn, the business integration services 108 and 122 may access distributed resources through various applications 112, 126, and 130 and the business integration service shared workspace 114. The resource systems may include diverse and distributed operational support systems for local exchange carriers, vendors, competitors, trading partners, data storage systems, and other systems. In effect, the business integration service systems 108, 114, and 122 function to mediate the disparate data and functions resident in the resource systems by providing a consistent functional interface to client applications. The business integration service systems 108, 114, and 122 may provide additional functional capabilities not supported by the resource systems.

The business integration services 108 and 122 and the business integration services shared workspace 114 represent one or more server systems providing computing functions and data to the business application service 102 through the common integration bus 106 and adaptor 104. The business integration services 108 and 122 access one or more remote resource systems or applications 112, 126 and 130 through various adaptors 110, 124 and 128. The remote resources may include databases, usage systems, PREMIS systems, ASON systems, TIRKS®, Service Order Retreival Distribution (SORD) system, and CRIS systems. The business integration services 108 and 122 are organized to access such remote resources to acquire data or perform a requested function and to relay the data or result to the business application service 102. The business integration services 108 and 112 may perform functions such as product management, customer information management, order management, network resource management, service management, location information management, usage management, rating and pricing, bill preparation, and trouble administration.

For example, the business application service 102 may access data or functionality associated with the business integration service 108 through the adaptor 114 and communications integration bus 106. The business integration service 108 accesses a resource or application 112 through an adaptor 110 and provides data or function results to the business application service 102. As illustrated in connection with the business integration service 108, a single application 112 may be accessed through an adaptor 110. Alternately, one or more applications may be accessed by a given business integration service through various adaptors. For example, business integration service 122 may access applications 126 and 130 through adaptors 124 and 128, respectively. In addition, the business application service 102 may access the business integration shared workspace 114. This business integration shared workspace 114 may be coupled with data 116, process states 120 and rules 118. In this manner, data 116, process states 120, and rules 118 may be served or applied from a business integration service tier without accessing a remote resource application.

The business application service 102 may, for example, provide billing, fulfillment, and customer assurance functionality to various access interfaces. These functionalities are achieved by accessing the business integration services 108 and 122 and the business integration shared workspace 114. For example, an integrated billing service may be accomplished through a business application service 102 accessing a business integrated service 122, which acquires usage data from various subscriber systems, such as applications 126 and 130. In another example, address verification may be retrieved by a single business integration service 108 accessing a resource application 112 associated with the requested address. Business application service 102 functionality is achieved through interaction with one or more business integration services and the business integration services shared workspace, each having access to various combinations of applications, data, rules, and process states.

In general, users utilizing a variety of communications, protocols and methods access the business application service 102. The business application service 102 accesses an appropriate business integration service or business integration shared workspace to acquire data or to perform a function. The business integration service or business integration shared workspace accesses data in remote distributed systems to provide the desired functionality. In this manner, a common applications interface may be provided through the business application service 102 while functionality is performed on a variety of remote and diverse resource systems and applications 112, 126 and 130 and through a shared workspace 114.

Figure 2:
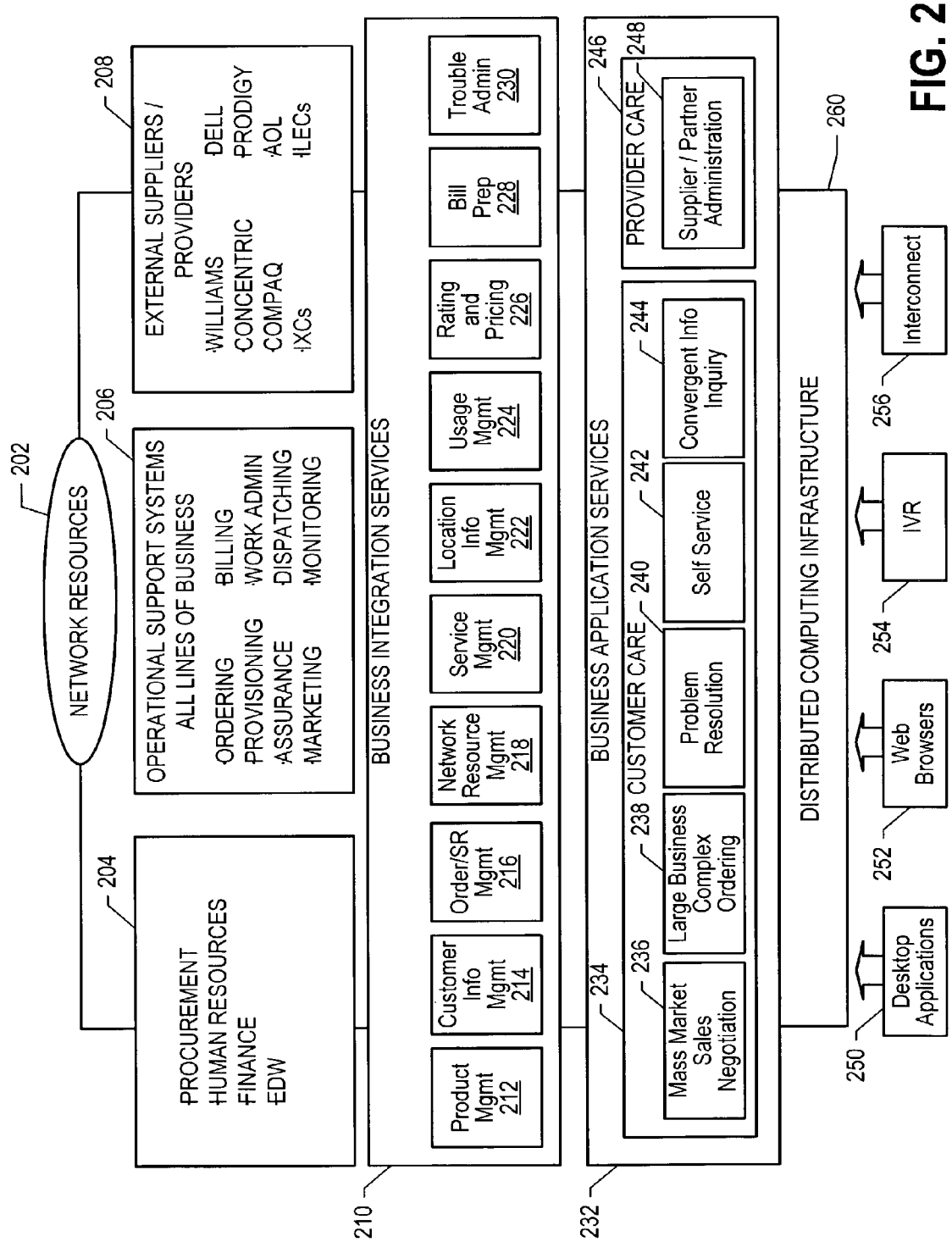

FIG. 2 depicts a further embodiment of an enterprise integration architecture. In this architecture, a variety of access methods are provided to diverse management and support systems. Access methods, such as desktop applications 250, web browsers 252, IVRs 254, and interconnection services 256 communicate to business application services 232. The business application services 232 access business integration services 210 that in turn access a variety of diverse business management systems 204, operational support systems 206, and external suppliers and providers 208. In this manner, diverse access systems may influence the functionality of diverse resource systems and interfaces.

The business application services 232 may be performed by one or more computational systems or servers. The business application services 232 may include customer care services 234 and provider care services 246. The customer care services 234 may include mass market sales negotiation 236, large business complex ordering 238, problem resolution 240, self-service 242, and a convergent information inquiry 244. The provider care services 246 may include supplier or partner administration services 248. The business application services 232 may function to control workflow processes and manage sessions and states. The business application services 232 may provide such functionality by accessing business integration services 210.

The business integration services 210 may be performed by one or more computational systems or servers. The business integration services 210 may manage and execute tasks and provide stateless business functions. This management and task execution may include providing interfaces, system integration, translation, coordination, scheduling, notification, caching, staging, and metadata repositories. Exemplary embodiments of the business integration services 210 include product management 212, customer information management 214, order/service request management 216, network resource management 218, service management 220, location information management 222, usage management 224, rating and pricing 226, bill preparation 228, and trouble administration 230. These business integration services 210 may function to access diverse resource systems and interfaces through the shared distributed computing infrastructure 260. For example, the business integration services 210 may access business management systems 204. These business management systems 204 may include procurement, human resources, finances, and enterprise data warehouse (EDW) functionality. In some embodiments, the business management systems 204 may take the form of legacy database systems, such as SAP or Oracle, among other similar systems. The business integration services 210 may also access operational support systems 206 through the shared distributed computing infrastructure 260. These operational support systems 206 may include ordering, provisioning, assurance, marketing, billing, work administration, dispatching, and monitoring functions. Further, the business integration services 210 may access external suppliers and providers 208 through the shared distributed computing infrastructure 260. These external suppliers and providers may include long distance companies, network resource suppliers, equipment suppliers, exchanges, and LECs, among others.

The shared distributed computing infrastructure 260 may include shared infrastructure functions such as communications management, directory control, infrastructure management, security, and interconnection services. This infrastructure may be implemented using screen scraping such as SNA LU2, application peer-to-peer communications such as SNA-LU 6.2, IBM MQ Series, TCP/IP socket level programming, and other standard interfaces, such as CORBA, JAVA RMI/IIOP, JMS, JDBC, and message-oriented middleware. The network resources 202 may include network equipment such as switches, routers, connections, and remote terminals.

In one exemplary embodiment, a consumer may access a system through a web browser 252. The web browser may direct communication with the business application services 232 such as the consumer care services 234 (e.g. self service 242). This customer care module 234 may then access a business integration services module, such as the customer information management module 214. The customer information management module 214 may selectively communicate with a business management system 204. Using such a communications path, a consumer may change their associated customer information. In this manner, consumers located in differing geographic regions may access a common website to change information on diverse resource systems.

In another example, a competitive local exchange carrier (CLEC) may access a business application service 232 through an interconnection service 256. The CLEC may attempt to validate an address or facilitate a channel facility assignment. The business application service 232 may then access a module associated with the business integration service 210, such as the location information management module 222 or the network resource management module 218. The business integration service 210 may then access the business management systems 204 or the operational support systems 206 to facilitate the data transfer or functionality sought by the CLEC. In general, various examples can be envisioned that show a diverse set of access points and protocols accessing a diverse set of resource systems and interfaces to provide a common set of application services.

Figure 3:
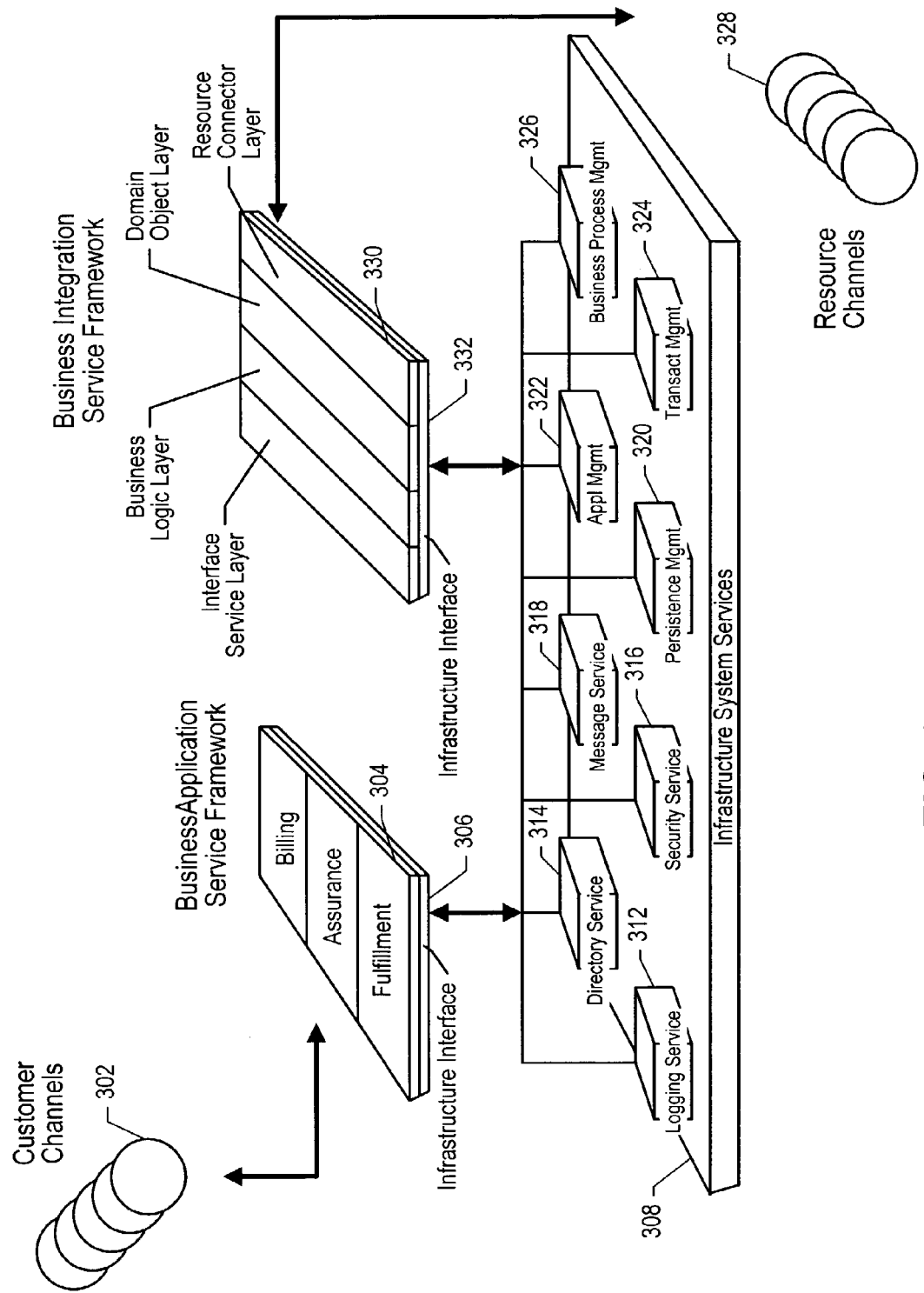

FIG. 3 depicts a further exemplary embodiment of an enterprise integration architecture. In this exemplary embodiment, various customer channels 302 access a business application framework 304. This business application services framework 304 has infrastructure interfaces 306. These infrastructure interfaces 306 access the infrastructure system services 308. The business application services framework 304 may provide various functionality including billing, assurance and fulfillment.

The infrastructure system services 308 provide the mechanisms and adaptations to enable information exchange. The infrastructure system services 308 may include industry standard internet protocols and services, such as CORBA, Jini, and HTTP; interface and data representations, such as XML, and IDL; integration enabling tools; adaptation design patterns; and naming services. The infrastructure system services 308 may include various functional modules such as logging services 312, directory services 314, security services 316, message services 318, persistence management services 320, application management services 322, transactional management services 324, and business process management services 326.

The infrastructure system services 308 may provide an application management service 322 such as a software management capability. This capability may permit operation, administration, and maintenance capabilities. The infrastructure system services 308 may also provide a configuration policy rules interface. The process management services 326 may provide a common rules repository for workflow and policy behavior. The security services 316 may apply common security policies across all layers and modules. For example, the permissions of initiators of object invocation may be validated prior to execution. The logging services 312 may log communication between various modules. For example, requests and responses from the business application service and business integration service systems may be logged by logging services 312. Persistence management services 320 may control the caching of objects. Messaging services 318 may utilize messaging standards such as Java Messaging Services (JMS) to provide synchronous, asynchronous, point-to-point, and publish/subscribe messaging. Caching services may be used to improve processing time and data recovery, and to provide temporary persistence containers. Directory services 314 may be used for looking up distributed service registrations and may permit federation of name spaces across numerous software and hardware platforms. The infrastructure system services 308 may also have infrastructure interfaces for providing common access specifications.

The business application services framework 304 and the infrastructure systems services 308 may access a business integration services framework 330 through an infrastructure interface 332. The business integration service framework 330 may include multi-layered logic. This multi-layered logic may include an interface services layer, a business logic layer, a domain object layer, and a resource connector layer.

Through these layers, the business integration service framework 330 may connect with and interact with multiple diverse and distributed resource channels 328. With such a system, distributed and diverse customer channels 302 may access a common application services framework 304. This framework 304 may take advantage of reusable infrastructure systems services 308 and the common business integration services framework 330 to facilitate communication with various distributed and diverse resources 328. For example, various CLECs may optionally access billing information through a variety of proprietary or standard protocols. The billing information can be retrieved from diverse resource channels 328 through common reusable infrastructure systems and frameworks.

Figure 4:
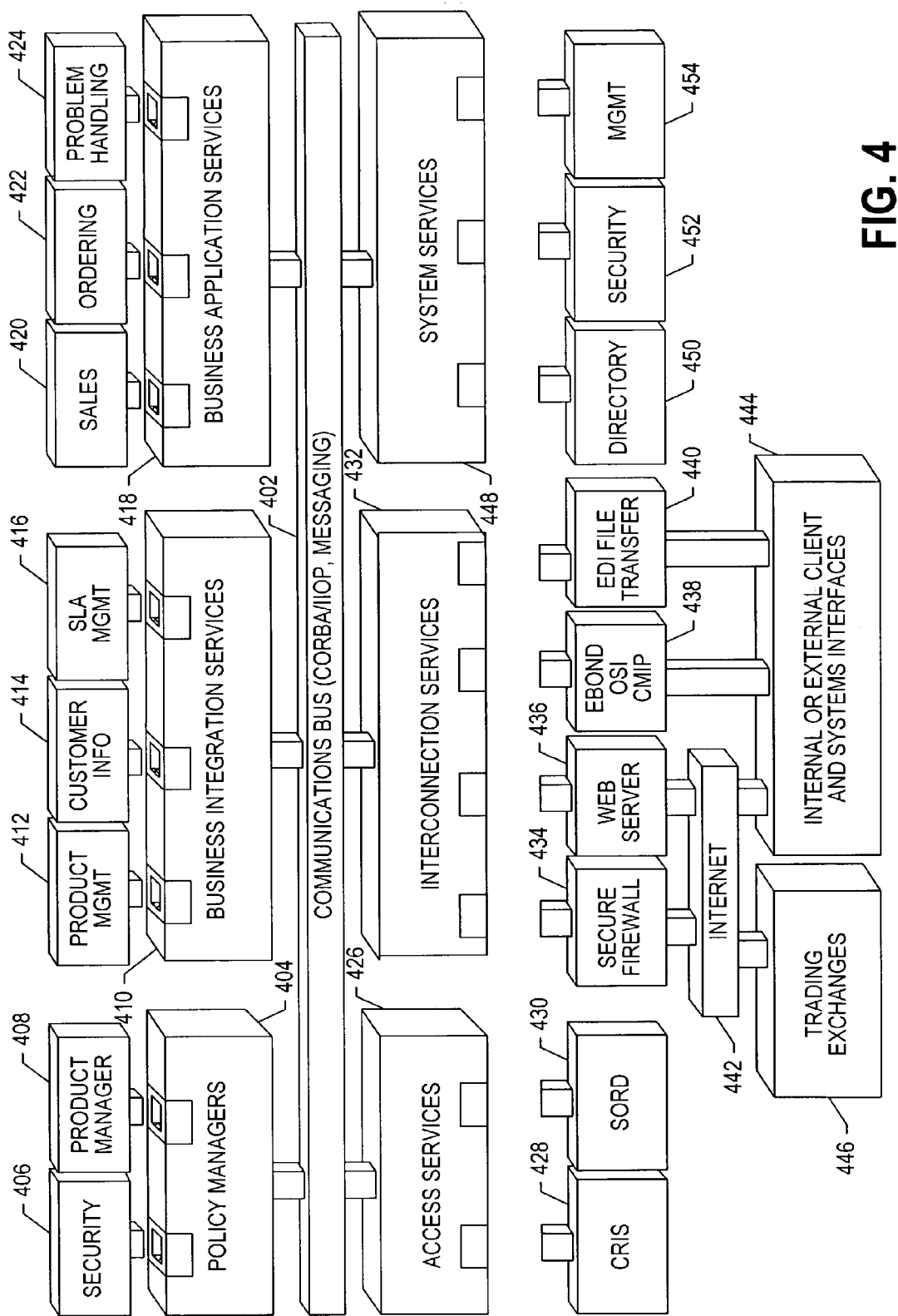

FIG. 4 depicts another exemplary embodiment of an enterprise integration architecture. Interconnection services 432 connect to a common communications bus 402 to provide access to business application services 418. These business application services 418 in turn access the same communications bus 402 to provide access to the business integration services 410. In addition, various policy managers 404, access services 426, and system services 448 may access the common communications bus 402.

The common communications bus 402 may provide various functionality that conforms to communications standards such as CORBA/IIOP, Java RMI/IIOP, JMS, JDBC, and other message-oriented middleware.

The interconnection services 432 provide access to various interfaces, customers, and consumers. For example, trading exchanges 446 and internal or external clients and system interfaces 444 may access the interconnection services 432 through various means. These clients 446 and 444 may access a secured firewall 434 or a web server 436 through the Internet 442. In another embodiment, the client and system interfaces 444 may access the interconnection services 432 through an EBOND open system interconnect (OSI) common management information protocol (CMIP) system 438, CORBA, or an electronic document interchange (EDI) file transfer system 440. Through these access means 434, 436, 438, and 440, the clients 444 and exchanges 446 may access the functionality of the business application services 418 by connecting with the common communications bus 402 through the interconnections services 432.

The business application services 418 may include services such as sales modules 420, ordering modules 422, and problem handling modules 424. These modules may provide a common interface to clients and customers for accessing diverse resource systems. The business application services 418 may access the business integration services 410 through the common communications bus 402.

The business integration services 410 provide access to modules such as product management 412, customer information management 414, and service level agreement management 416. The business integration services 410 may, in turn, access the access services 426 to provide access to resource systems, such as CRIS 428 and service order retrieval distribution (SORD) 430 modules, among other diverse and distributed resource systems.

In addition, various other services and systems may access the common communications bus 402. These systems may function to manage the common communications bus or the other component systems. For example, policy management systems 404 may connect to the communications bus 402. A policy management system 404 may include security systems 406 and product manager systems 408. The system services systems 448 may provide access to the communications bus 402, to directory systems 450, security systems 452, and management systems 454.

Figure 5:
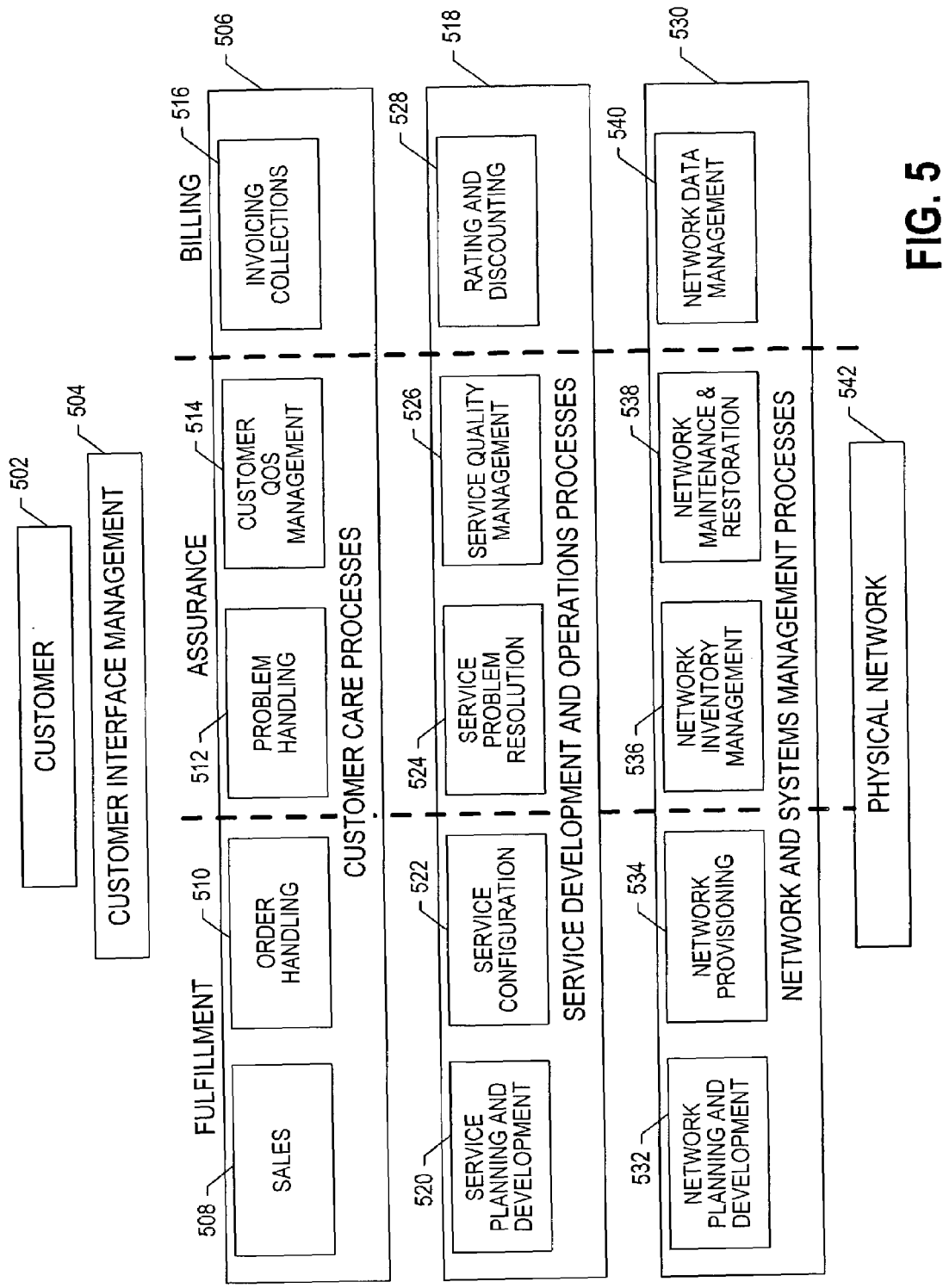
FIG. 5 depicts an exemplary embodiment of a business application service.

FIG. 5 depicts an exemplary business application service that has been adapted from the framework published by the Telemanagement Forum as the Telecom Operations Map (TOM). The eTOM may also be implemented as a business application service. The TMF/TOM and eTOM are business process models that are useful as a framework for standardization.

In FIG. 5, a customer or client 502 may interact with the framework through a customer interface management system 504. The framework provides for three broad categories of functionality, including fulfillment, assurance, and billing. These broad functionality areas are arranged in levels such as customer care processes 506, service development and operations processes 518, and network and system management processes 530. For example, fulfillment functionality may be arranged in terms of sales modules 508 and order handling modules 510 arranged in the customer care processes level 506. Services planning and development modules 520 and service configuration modules 522 are arranged in the service development and operations processes level 518, and network planning and development modules 532 and network provisioning modules 534 are arranged in the network and system management processes 530.

Similarly, assurance functionality may be provided using problem handling modules 512 and customer QOS management 514 in the customer care processes level 506; service problem resolution module 524 and service quality management 526 in the service development and operations processes level 518; and network inventory management 536 and network maintenance and restoration module 538 in the network and systems management processes level 530. Billing functionality may be provided through invoice collection modules 516 in the customer care processes level 506; rating and discounting modules 528 in the services development and operations processes level 518, and network data management module 540 in the network and systems management processes level 530. Through these high-level business application service modules, more specific process flows can be identified. Through these specific process flows, the business application services may access the physical network 542. For example, various modules may access a business integration services system.

With an application service including the example described above, an interface for federated access to customer data may be provided. This federated access may aggregate and manage customer data from diverse resource systems. The customer data may include personal customer information, usage data, subscription service data, service request data, address data, and telephone number data, among others. For example, the federated access may result in an aggregate bill including charges for several diverse communications services and products.

Figure 6:
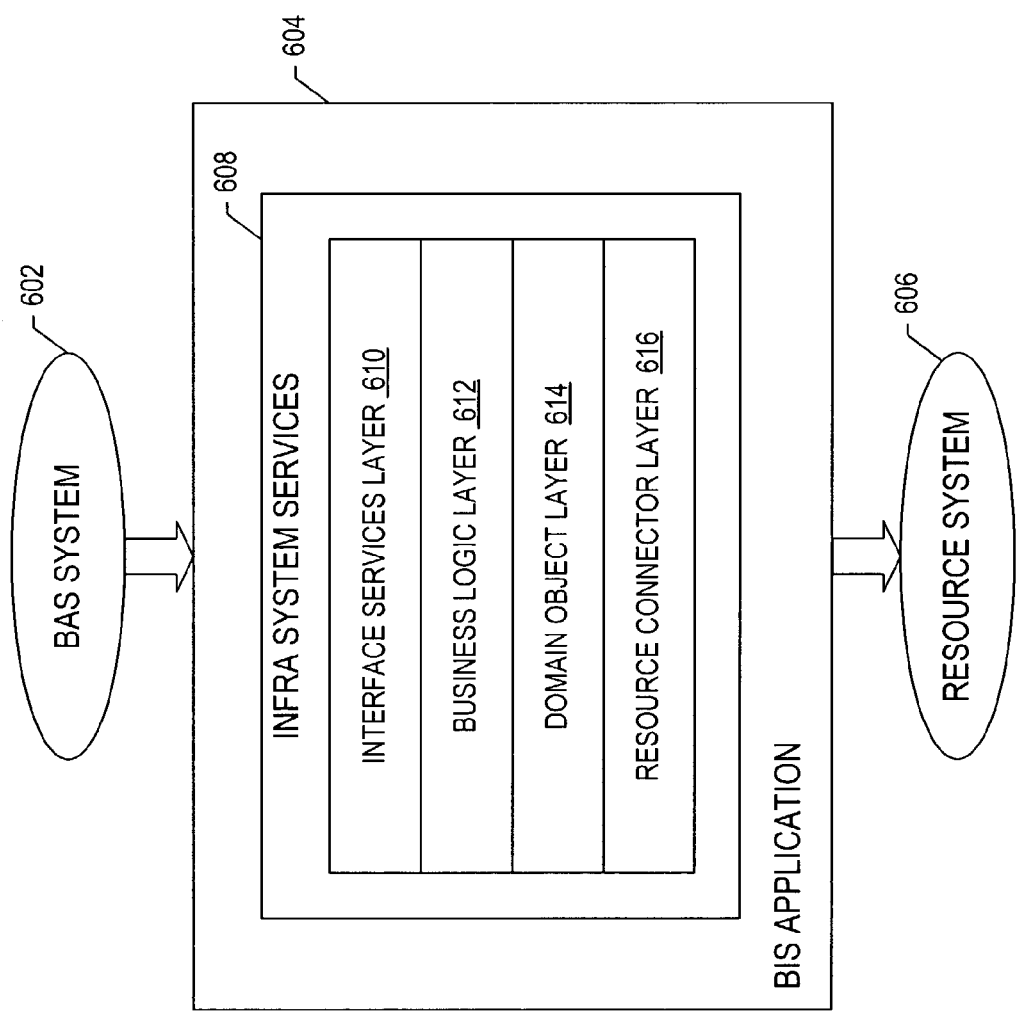
FIGS. 6, 7, 8, 9, 10, 11 and 12 depict exemplary embodiments of a business integration service.

FIG. 6 depicts an exemplary embodiment of a business integration service application. The business integration services application 604 may reside on one or more servers and acts as an intermediary system between the business application services system 602 and the resource system 606. In this exemplary embodiment, the business integration services application 604 includes a layered architecture integrated through infra system services 608.

The layered structure may include an interface services layer 610, a business logic layer 612, a domain object layer 614, and a resource connector layer 616. Each layer may be instantiated multiple times. The interface services layer 610 may provide interfaces to systems such as business application services system 602.

Communications from the business application services system 602 are received and directed to the business logic layer 612. The business logic layer 612 provides business logic to control the flow and enforcement of enterprise business rules and policies for the business integration services. This business logic may be separated from the knowledge of the resource systems through domain objects. The business logic layer 612 accesses the domain object layer 614 to instantiate domain objects, which in turn may access resource system 606 through the resource connection layer 616. The domain object layer 614 integrates data from various resources into the business logic layer functionality. The domain object layer 614 may access data on resource systems through the resource connector layer 616. In this manner, the domain object layer 614 may integrate and manipulate data without detailed knowledge of the resource interface systems. The resource connector layer 616 connects and interfaces with diverse resource systems using various translators, connectors, and parsers.

Figure 7:
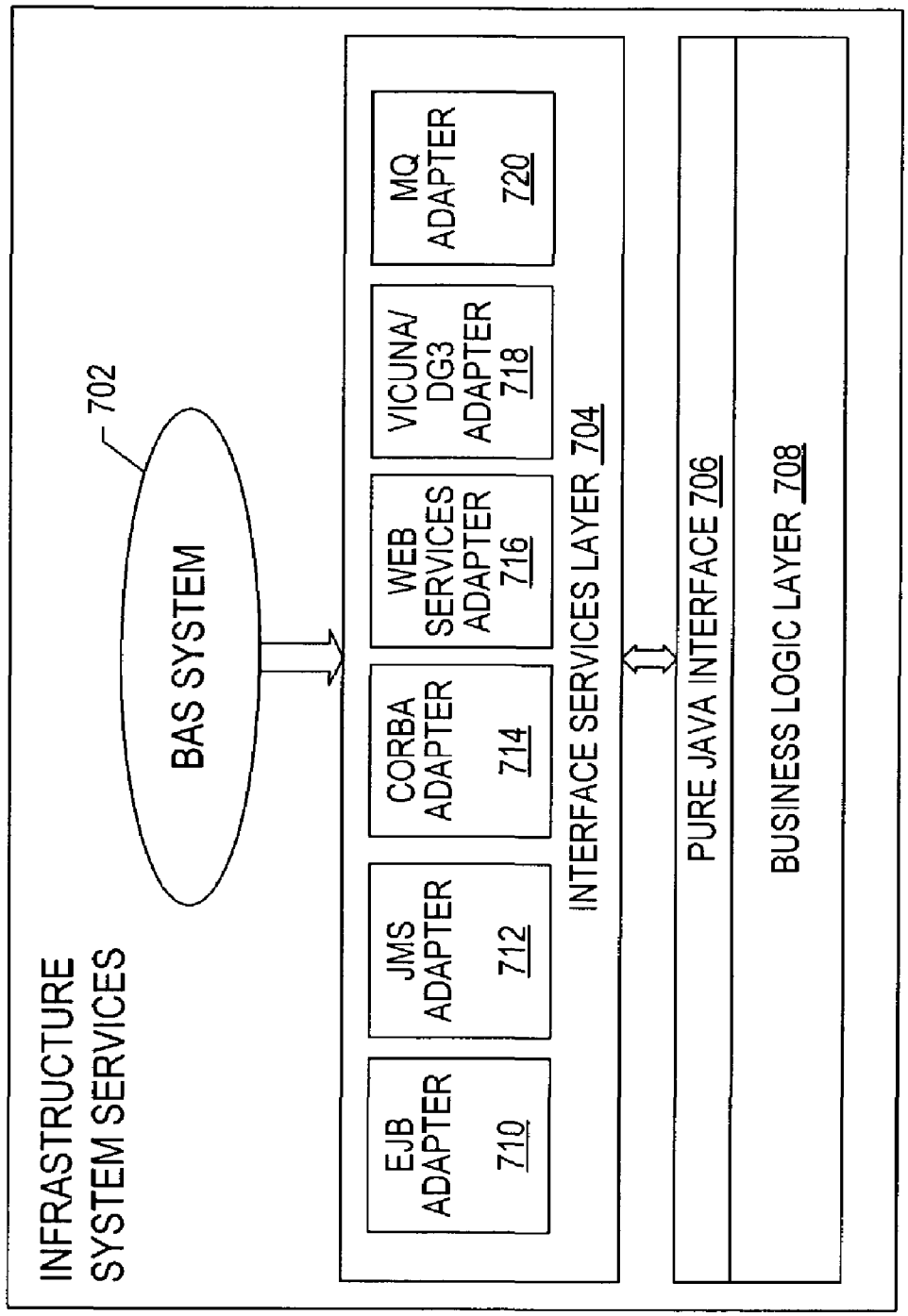

FIG. 7 depicts an expanded interface services layer 704. The interface services layer 704 interacts with the business application services system 702 through various adaptors. These adaptors may include Enterprise Java Bean (EJB) adaptor 710, Java Messaging Service (JMS) adaptor 712, Common Object Request Broker Architecture (CORBA) adaptor 714, web services adaptor 716, internal middleware adaptor 718, and IBM® Message Queue (MQ) Series adaptor 720, among other adaptors. With these adaptors, the integration services layer may integrate with the business application services system 702 and a Java interface 706 associated with the business logic layer 708.

Figure 8:
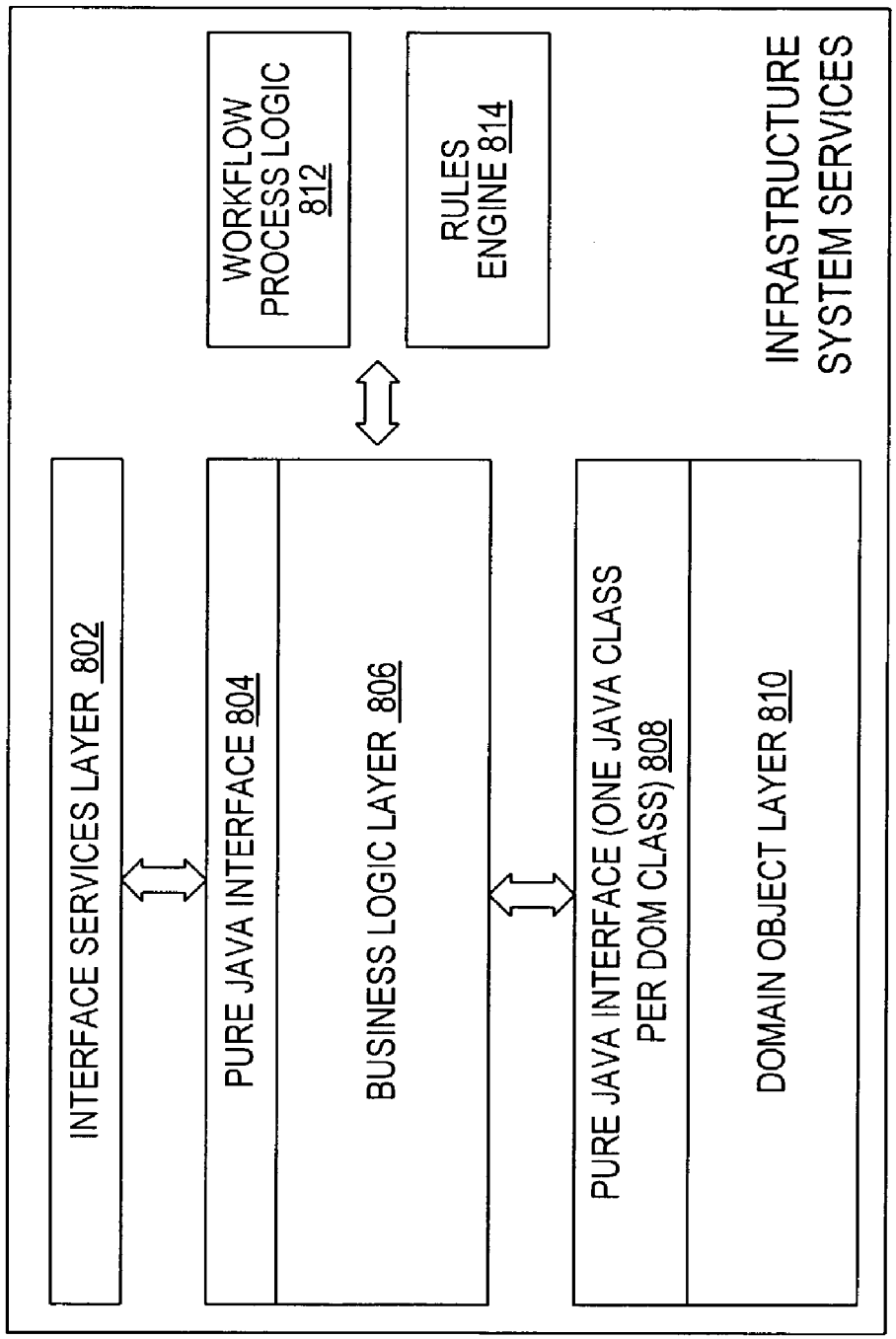

FIG. 8 depicts an illustrative business logic layer 806. The business logic layer 806 provides business logic that controls process flow and enforces enterprise business rules and policies. The business logic layer 806 interacts with the interface services layer 802 through an interface 804 and, also, interacts with the domain object layer 810 through an interface 808. The business logic layer 806 may also interact with workflow process logic 812 and a rules engine 814. The business logic layer 806 may provide various functionality including product management, customer information management, order management, network resource management, service management, location information management, usage management, rating and pricing, bill preparation, and trouble administration. The business logic layer 806 may use a common identity or access key provided by the business application service.

Figure 9:
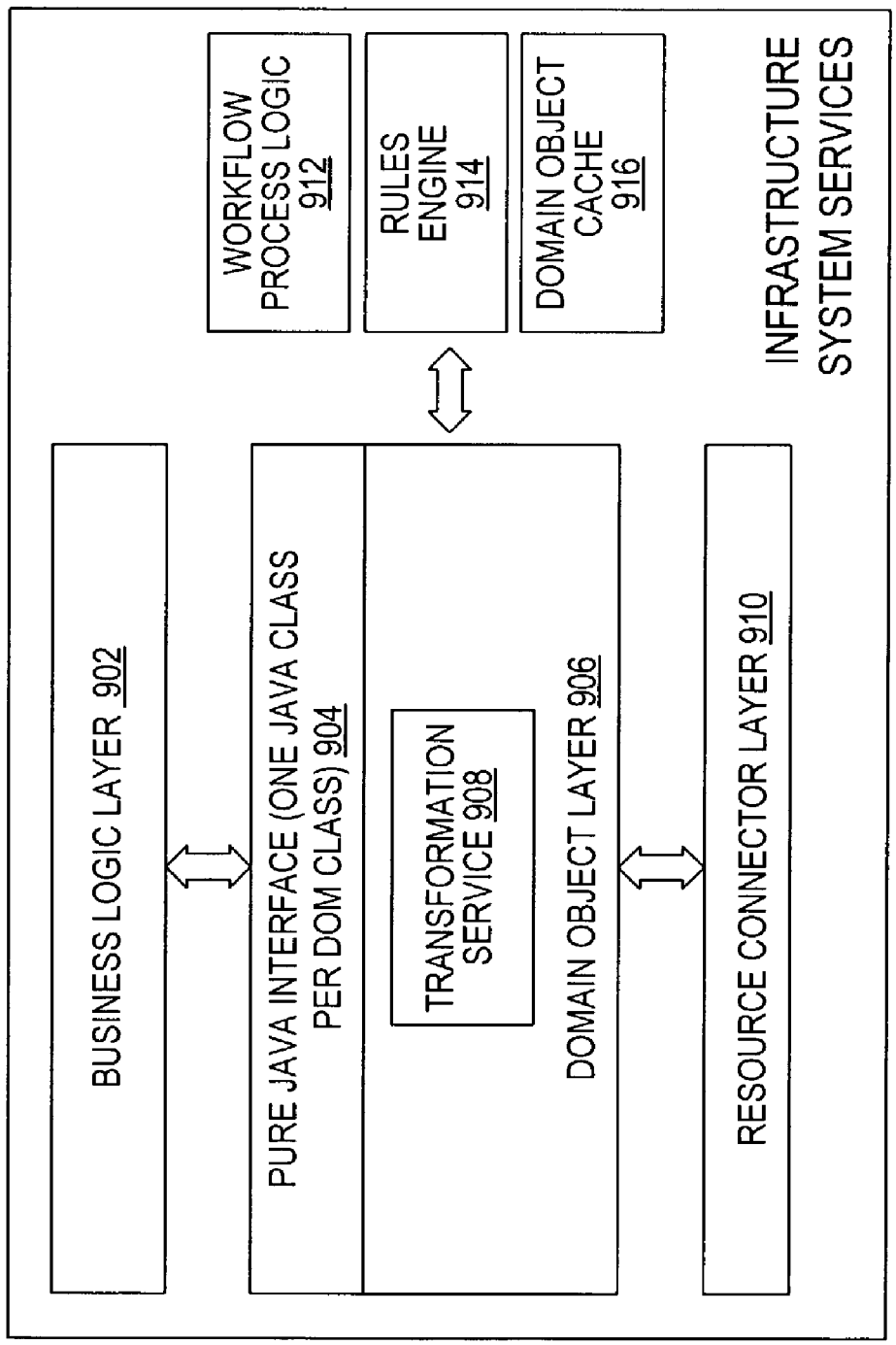

FIG. 9 depicts an illustrative domain object layer 906. The domain object layer 906 provides instances of domain objects to the business logic layer 902 and interacts with the business logic layer 902 through an interface 904. The domain object layer 906 also interacts with the resource connector layer 910. The domain object layer 906 may include a transformation service 908 that transforms the information that is stored in various resource systems into data object instances. A resource connection layer may access and translate data via resource connectors. This data may be provided to the domain object layer 906 for transformation into domain objects. In addition, the domain object layer 906 may interact with workflow process logic 912, rules engine 914 and domain object cache 916. For example, the process logic 912, rules associated with the rules engine 914, and management of domain object cache 916 may be influenced by the instances of the domain objects. The workflow process logic 912 and rules engine 914 may, in turn, influence the actions of the business logic layer 902.

To create a domain object, the domain object layer 906 determines the resource system transactions that may be used to create a requested domain object. In part, the domain object layer 906 may be directed by drivers or controllers in the business logic layer 902. Then, the domain object layer 906 requests the resource connection layer 910 to perform the resource system transactions. The domain object layer 906 translates the results of the resource system transactions into domain objects. The domain object layer 910 may use the common identity or access key provided by the business application service when communicating with the resource connector layer 910.

Persistence of domain objects may be utilized through the domain object cache 916. Domain objects may be cached as requested or pre-fetched according to rules and policies. These rules and policies may also be tuned at runtime to enhance performance.

An illustrative method for creating and using a domain object includes the step of receiving a first communication. This first communication may, for example, be a request for an address validation, a channel facility assignment request, a telephone number inquiry, a telephone number cancellation, a telephone number reservation, an information request, or a transaction request. A domain object is instantiated. Then, interaction is initiated with a resource system. The resource systems may, for example, be a PREMIS, ASON, or TIRKS® system or other databases, operational support systems or billing support systems. In the event that a response is provided by the resource system, the response is transformed into the domain object. The system, then, provides a second communication. This second communication may be sent to a business application service and provided to a requestor.

Figure 10:
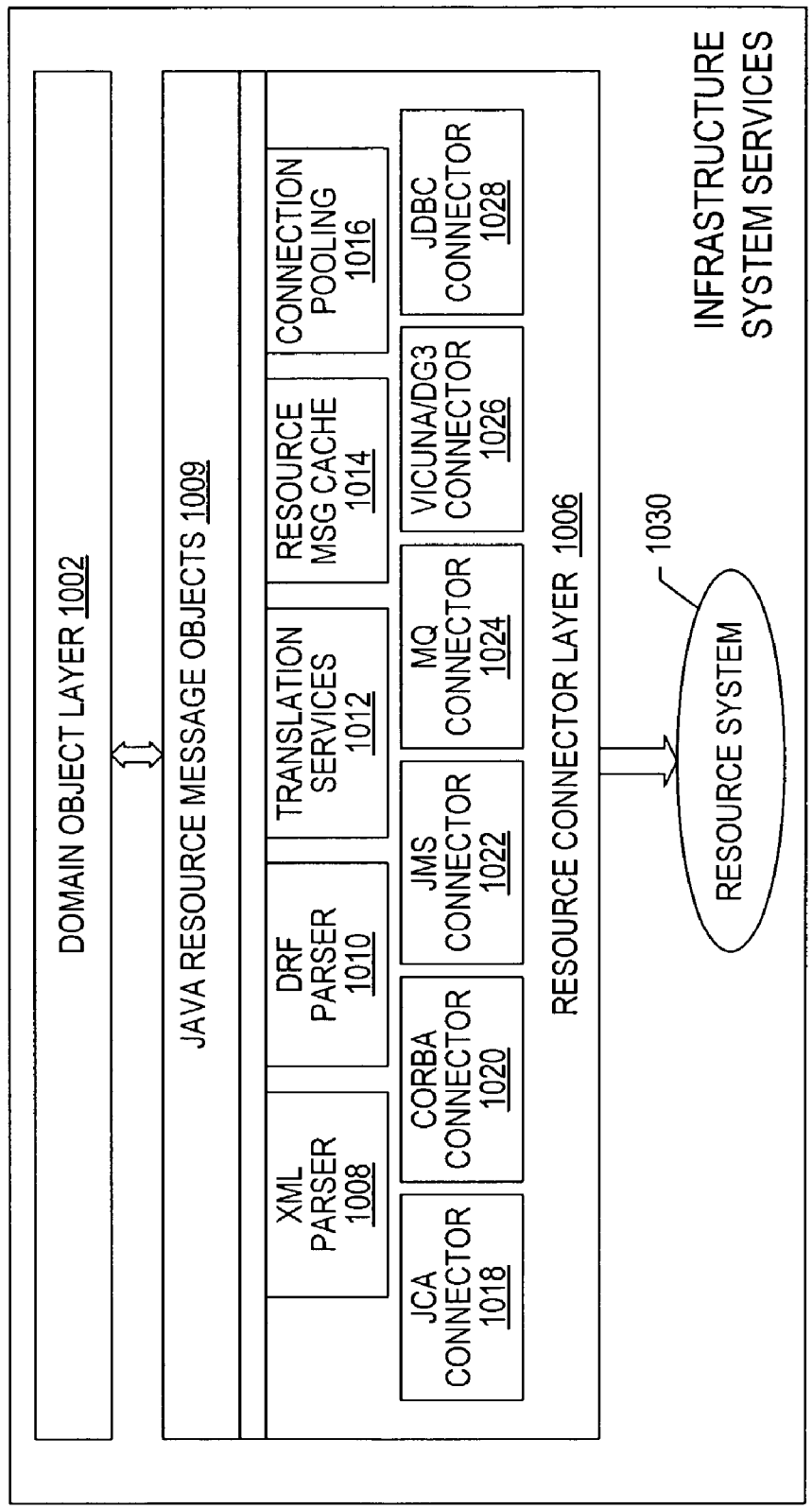

FIG. 10 depicts an expanded resource connector layer 1006. The resource connector layer 1006 communicates with the domain object layer 1002 through a Java resource message object 1009. The resource connector layer 1006 includes connectors, parsers and services, such as XML parser 1008, data representation format (DRF) parser 1010, translation services 1012, resource message cache 1014, connection pooling 1016, Java Connection Architecture (JCA) connector 1018, CORBA connector 1020, JMS connector 1022, IBM® MQ Series connector 1024, internal middleware connector 1026, and JDBC connector 1028. Through the resource connector layer 1006, the domain object layer 1002 may communicate with the diverse resource systems 1030.

For example, the resource connector layer 1006 may receive a request from the domain object layer 1002. The resource connector layer 1006 may, then, connect to resource systems to facilitate a transaction. The results of the transaction are then translated into a fielded response. The transaction results are then provided to the domain object layer 1002.

In an exemplary method for use by the resource layer, a domain object may request data or a transaction. In response to a request, the resource layer may request a transaction. The transaction may be a database query, facility assignment, or resource allocation, among others. The resource layer connects to the resource system. A response or result from the resource system or transaction may be translated. For example, the response may be translated into fielded data. The translated response may then be provided to the domain object or other layers of the business integration service.

Figure 11:
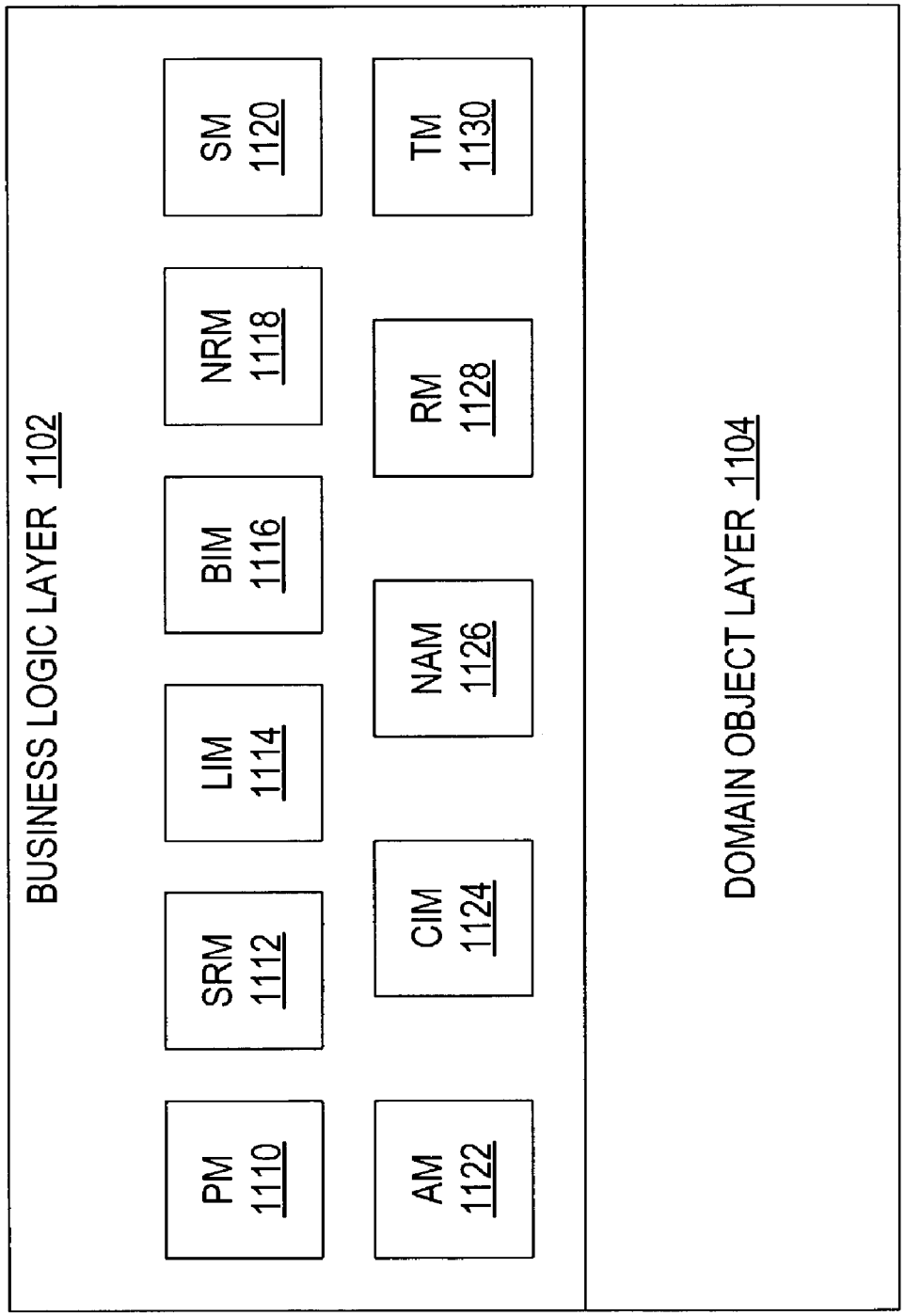

FIG. 11 depicts a further example of the layered business integration service system. A business logic layer 1102 is coupled to a domain object layer 1104. The business logic layer 1102 includes functional modules such as product management (PM) 1110, service resource management (SRM) 1112, location information management (LIM) 1114, billing information management (BIM) 1116, network resource management (NRM) 1118, service management (SM) 1120, availability management (AM) 1122, customer information management (CIM) 1124, network address management (NAM) 1126, resource management (RM) 1128, and trouble management (TM) 1130. The product management module 1110 integrates product information into the enterprise. The service request management module 1112 integrates service request information into the enterprise. The location information management module 1114 integrates location information into the enterprise. The billing information management module 1116 integrates billing information into the enterprise. The network resource management module 1118 integrates network resource information into the enterprise. This network resource management module 1118 may have similar functions to the network address management module 1126 and resource management module 1128. The service management module 1120 integrates service information into the enterprise. The availability management module 1122 integrates product feature and service availability information into the enterprise. The customer information management module 1124 integrates customer information into the enterprise. The network address management 1126 integrates network address information into the enterprise. The resource management module 1128 integrates network resource information into the enterprise. The trouble management module 1130 integrates trouble report information into the enterprise. These modules function along with the business logic layer 1102 to determine what data to gather or action to facilitate in response to communication from a business application service. The business logic layer 1102 and its modules instantiate objects associated with the domain object layer 1104. The domain object layer 1104 then accesses resource connections to acquire the requested data or facilitate the desired action. Information or results may then be transferred back through the domain object layer 1104 to the business logic layer 1102 and out to the requesting business application service system.

Figure 12:
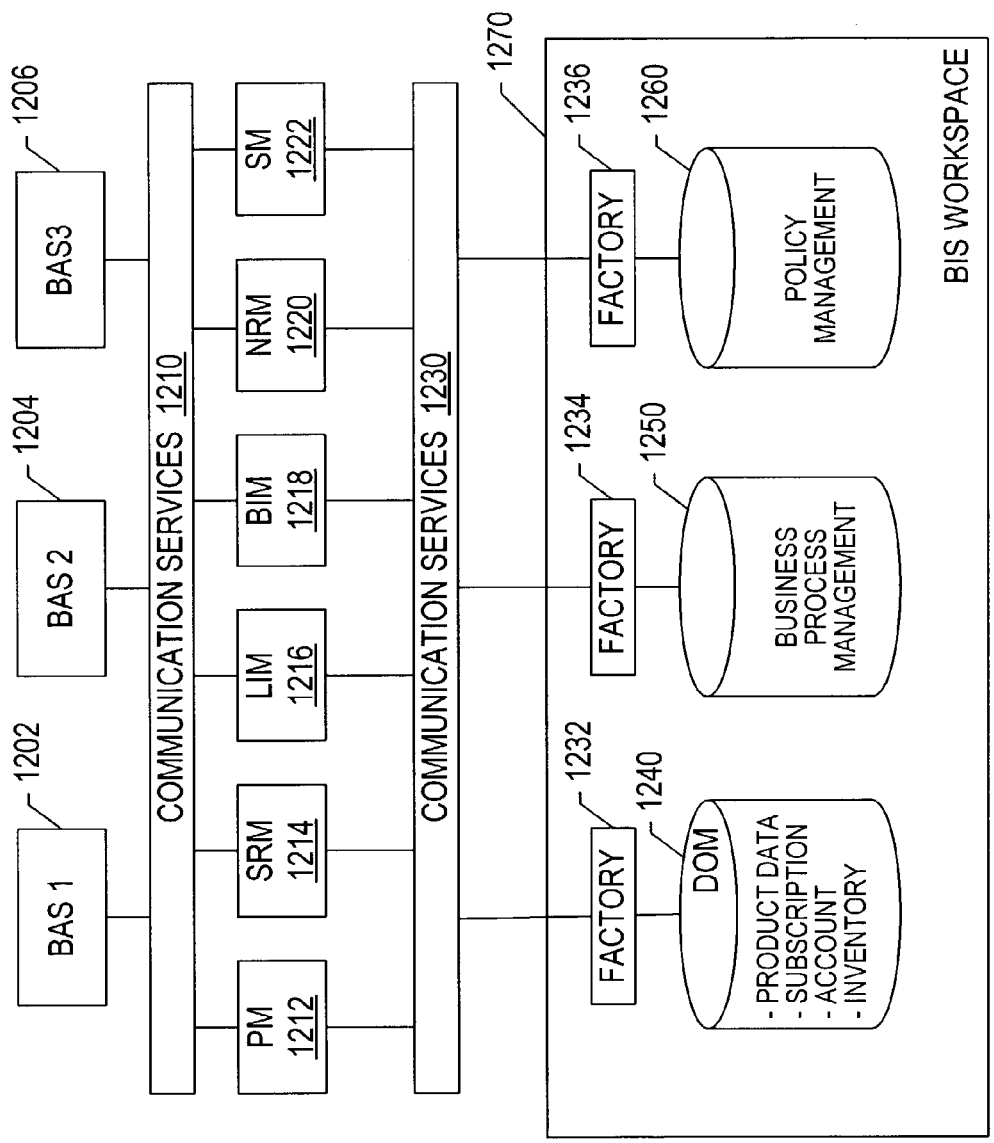

FIG. 12 represents operation of an exemplary business integration services system in action in response to various business application services events. The business integration services system provides business logic and resource interaction. Events such as BAS 1 1202, BAS 2 1204, and BAS 3 1206 are communicated through the communication services 1210 to various business logic modules such as product management 1212, service request management 1214, location information management 1214, billing information management 1218, network resource management 1220 and service management 1222. These business logic modules determine what information or action is needed in response to the business application services event. These modules then communicate through a communications service 1230 to a business integration services workspace 1270. This business integration services workspace 1270 may be organized into various factory elements. For example, factory elements 1232, 1234, and 1236 are connected to domain object models 1240, business process management 1250 and policy management 1260, respectively. The business logic modules may, using a domain object, access product data, subscription data, accounting, and inventory data, among others. In addition, the systems may access business process management 1250 or policy management 1260. In this manner, any one business logic module may access one or more of the logical factories 1232, 1234, and 1236 to perform the desired action or to acquire the requested data.

Figure 13:
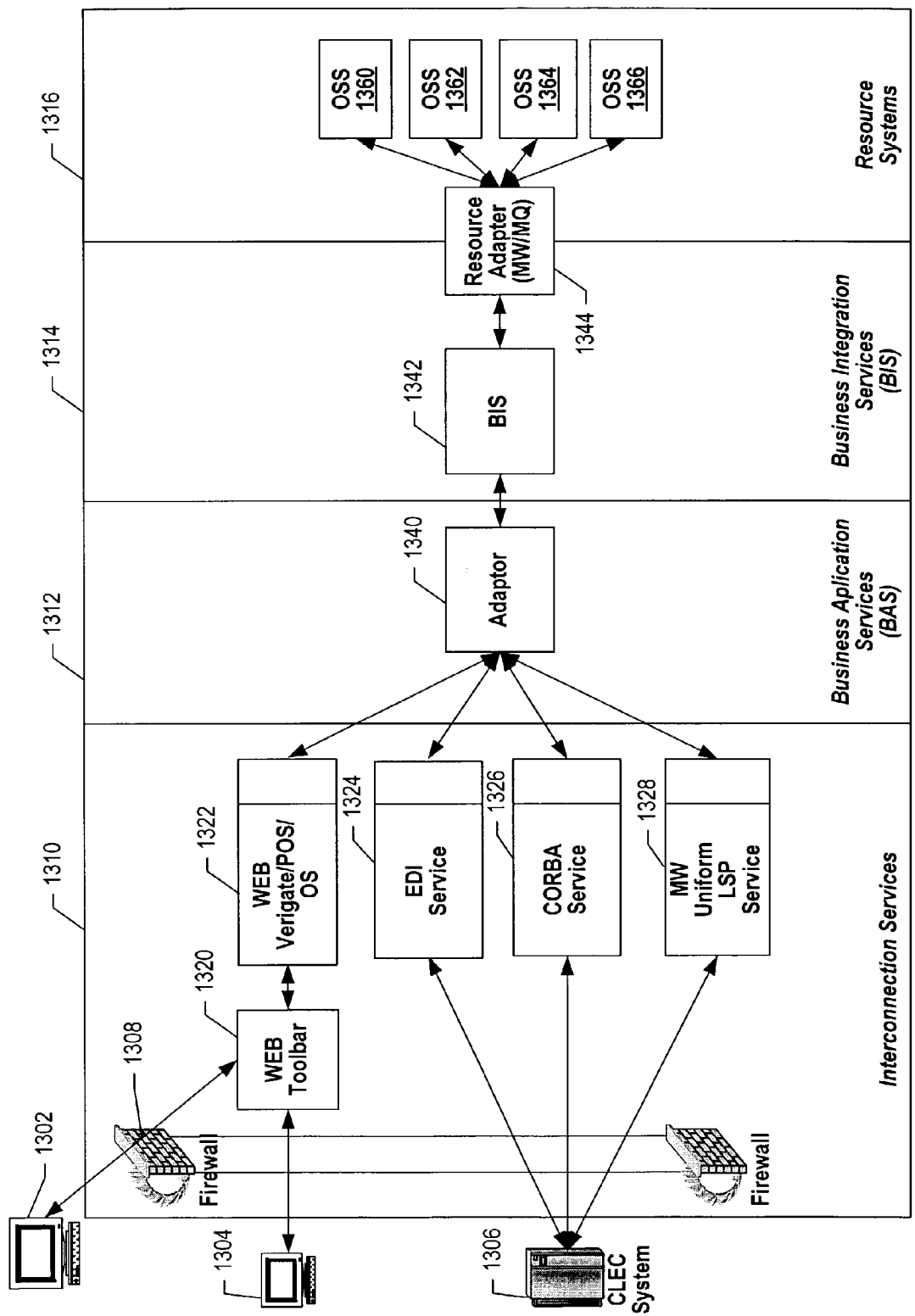
FIGS. 13, 15 and 17 depict exemplary applications of the enterprise integration architecture.

FIG. 13 depicts an exemplary enhanced operational support system using the enterprise integration architecture. User systems 1302 and 1304 and CLEC systems 1306 may access various interfaces associated with the interconnection services 1310. For example, customer 1302 may access a web toolbar 1320 and web VERIGATE/POS/OS system 1322. Alternatively, customer 1304 may access the same web toolbar 1320 and web VERIGATE/POS/OS system 1322 through a firewall 1308. Similarly, the CLEC systems 1306 may access various interconnection services 1310 through firewall 1308. For example, the CLEC systems 1306 may access EDI service 1324, CORBA service 1326, and message-oriented middleware (MW) uniform LSP service 1328. The web toolbar 1320 may interact with a web VERIGATE/POS/OS system 1322. Each of the systems or services 1322, 1324, 1326 or 1328 may have an interface plug-in for interaction with an adaptor 1340. These plug-ins 1336, 1334, 1332, and 1330 provide a communications interface to the business application services layer 1312, which includes the ordering and billing forum (OBF) adaptor 1340. The OBF adaptor 1340 communicates with a business integration services system 1342 in the business integration service layer 1314. The business integration services system 1342 communicates with a resource adaptor or connector 1344 to various resources such as operational support systems. For example, through the resource adaptor 1344, the business integration services system 1342 can communicate with diverse operational support systems (OSS) including OSS 1360, OSS 1362, OSS 1364, and OSS 1366.

Figure 14:
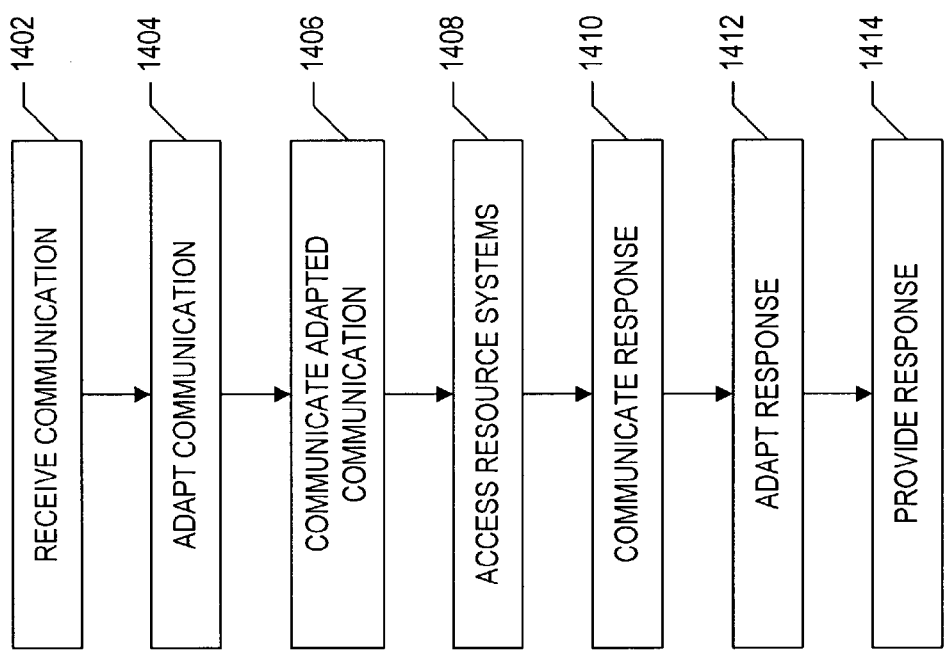
FIGS. 14, 16 and 18 depict exemplary methods for use by a distributed computer system.

FIG. 14 is an exemplary method for use by the architecture discussed above. The system receives a communication at step 1402. The communication may be received through various interconnection services. The communication is then adapted using an adaptor, at step 1404. The adapted communication is communicated to a business integration system, at step 1406. Resource systems are then accessed, at step 1408. The resource systems communicate the response, as shown at step 1410. This response is forwarded to the adaptor, at step 1412, and the response is provided to users through the interconnection services, at step 1414. Using this method, diverse interconnection services may be used to access and facilitate action at diverse resource systems.

The exemplary operational support system of FIG. 13 and the exemplary method of FIG. 14 may be further exemplified as shown in FIGS. 15 through 39. For example, the operational support system may be used to perform pre-ordering functions such as address validation, loop qualification, due date negotiation, dispatch facilitation, telephone number (TN) pooling, common language location information (CLLI) inquiry, primary interexchange code (PIC) and local primary interexchange code (LPIC) reference, network channel (NC) and network channel interface (NCI) inquiry, loop pre-qualification, customer service information (CSI) access, pending/poster order lists and details, provisioning order lists and details, bulk workload assessment, feature availability inquiry, universal service order code (USOC) and feature ID (FID) lookup, address inquiries by working telephone number (WTN), telephone number (TN) inquiries, telephone number (TN) reservation, telephone number (TN) confirmation, telephone number (TN) cancellation, and channel facility assignment (CFA) inquiries, among others.

Figure 15:
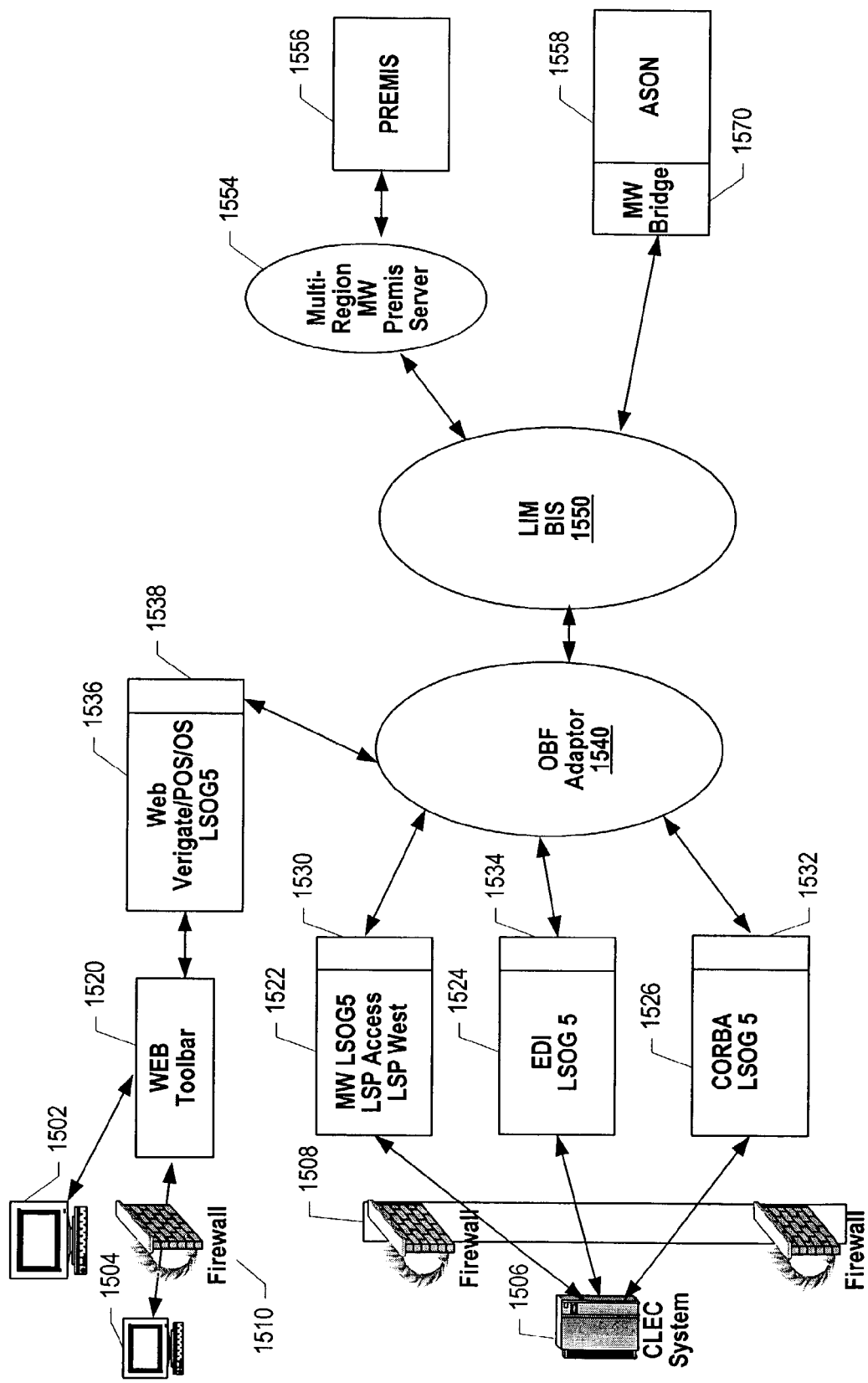

FIG. 15 depicts an exemplary embodiment of the system for address validation. Users 1502, 1504 and CLEC systems 1506 may access diverse resources through various interfaces. For example, customer 1502 and customer 1504, through a firewall 1510, may access a web toolbar 1520. This web toolbar may be in communication with a web VERI- GATE/POS/OS LSOG5 system 1536. CLEC system 1506 may, Through a firewall 1508, access interconnection services message-oriented middleware (MW) LSOG5 LSP Access LSP West 1522, EDI SOG5 1524 and CORBA LSOG5 1526. These interconnection services 1536, 1522, 1524 and 1526 have interfaces, 1538, 1530, 1534, and 1532 to an adaptor 1540. The adaptor 1540 accesses a location information management (LIM) module, a business integration services system 1550, and, then, accesses the appropriate operations system. For example, the location information management business integration service system 1550 may access a multi-state message-oriented middleware (MW) PREMIS server 1554 to acquire data from PREMIS system 1556. Alternately, the business integration service system 1550 may access an ASON system 1558 through a message-oriented middleware (MW) bridge 1570. With this system, an address validation request may be sent from the CLEC system through the OBF adaptor 1540 and location information manager 1550 to the PREMIS systems 1556 or 1558. These systems 1556 and 1558 may respond through the business integration service system 1550 and OBF adaptor 1540 to the CLEC system 1506. Similarly, communications may occur with customers 1502 and 1504 through the web toolbar 1520. In this manner, diverse access protocols may be used to access distributed and diverse address verification systems.

Figure 16:
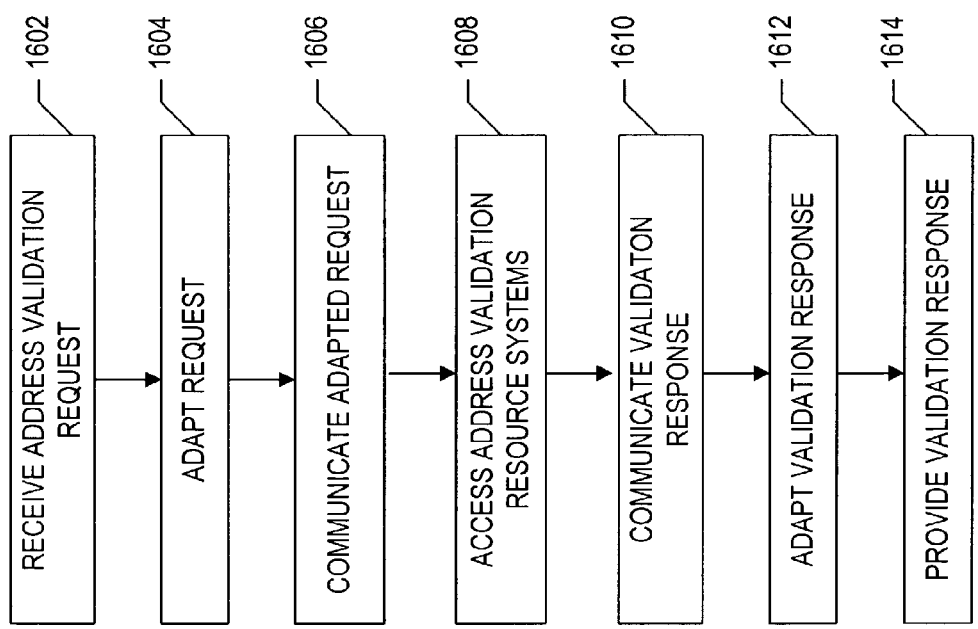

FIG. 16 depicts an exemplary method for address validation. An address validation request is received through an interconnection service, at step 1602. That address validation request is adapted, at step 1604, using an adaptor. The adaptor communicates an adapted request, at step 1606, to a business integration services system. The business integration services system accesses address validation resource systems, at step 1608, and communicates a validation response, at step 1610. The validation response is adapted, at step 1612, and provided through the interconnection services, at step 1614.

Figure 17:
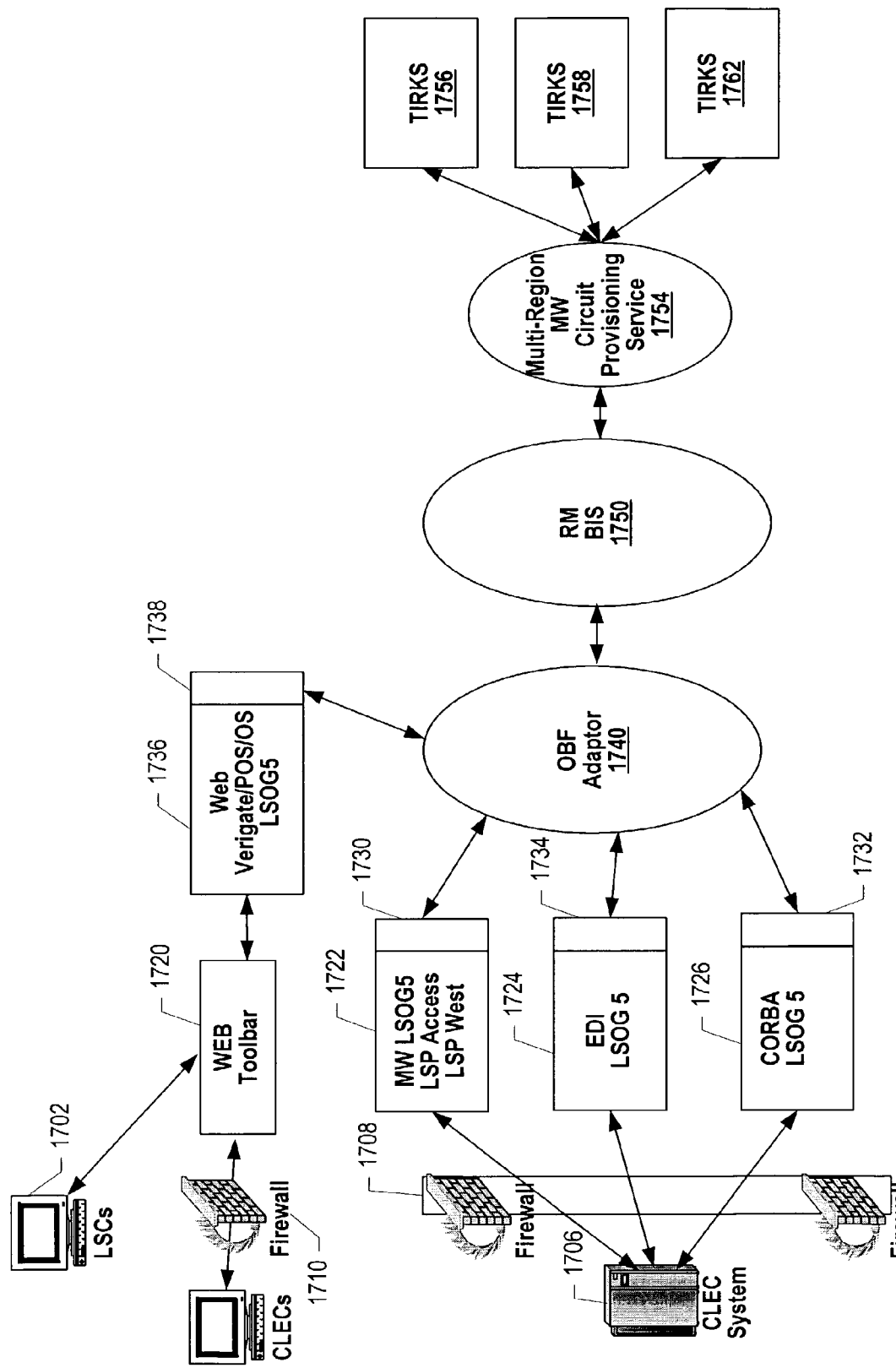

FIG. 17 represents an example of an enhanced operational support system for channel facility assignment. Users 1702 and 1704 may access a web toolbar 1720 and a web VERI-GATE/POS/OS LSOG5 system 1736 through firewall 1710. CLEC system 1706 may, through a firewall 1708, access interconnection services MW 1722, EDI 1724, and CORBA 1726. These interconnection services 1736, 1722, 1724, and 1726 may each have translation plug-ins such as 1738, 1730, 1734, and 1732, respectively to connect with an OBF adaptor 1740. The OBF adaptor 1740 accesses the resource management module in the business integration services system 1750. The business integration services system 1750 in turn accesses a multi-region circuit provisioning service 1754. This circuit 1754 accesses various TIRKS® systems 1756, 1758, and 1762. In this manner, customers 1702 and 1704 and CLEC systems 1706 may, through interconnection services interact with the OBF adaptor that in turn interacts with resource management systems and provisioning circuits to facilitate channel facility assignment at the TIRKS® resource system. The result of this operation is transferred back through the business integration system 1750 and adaptor 1740 and interconnection services to the clients and customers.

Figure 18:
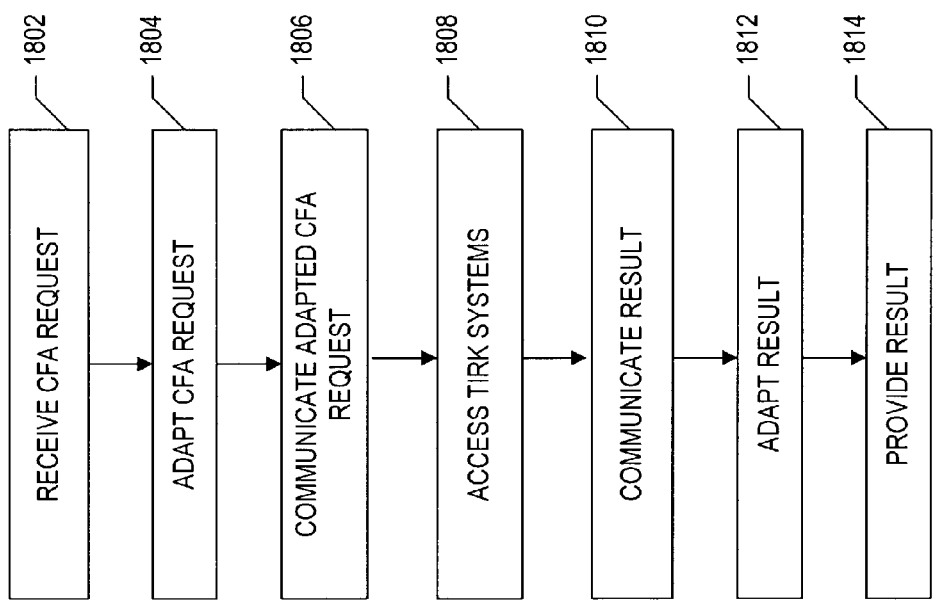

FIG. 18 depicts an exemplary method for channel facility assignment. A channel facility assignment request is received through an interconnection service, at step 1802. The channel facility assignment (CFA) request is adapted, at step 1804, and communicated to a business integration services system, at step 1806. The business integration services system accesses various TIRKS® systems, at step 1808, and communicates the result to the adaptor, at step 1810. The adaptor adapts the results, at step 1812, and provides the results through an interconnection service, at step 1814.

Figure 19:
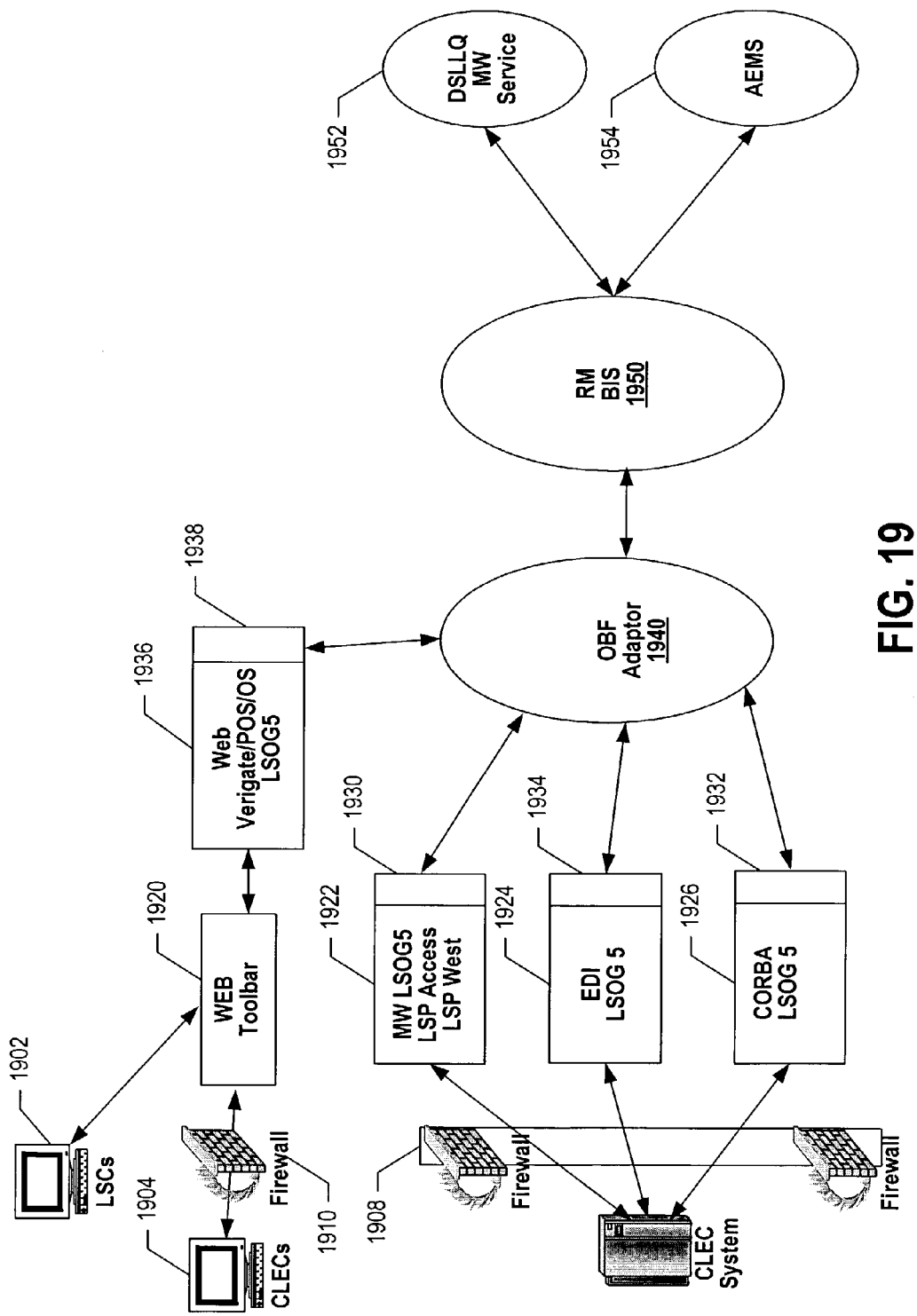
FIGS. 19 through 39 depict exemplary applications of the enterprise integration architecture.

FIG. 19 depicts a loop qualification for digital subscriber line (DSL) service. Prior to implementing or selling a DSL subscription, the loop may be tested to determine compatibility with or availability of DSL service. Much like FIG. 13, clients, customers and CLECs may access the system through various interfaces and the OBF adaptor 1940. A qualification request may be sent to the resource manager business integration service (RM BIS) 1950. The RM BIS 1950 may then access resource systems such as a digital subscriber line (DSL) loop qualification (LQ) message-oriented middleware (MW) service 1952 or an AEMS 1954. The RM BIS 1950 may selectively access these services 1952 and 1954 depending on the loop to be tested.

Figure 20:
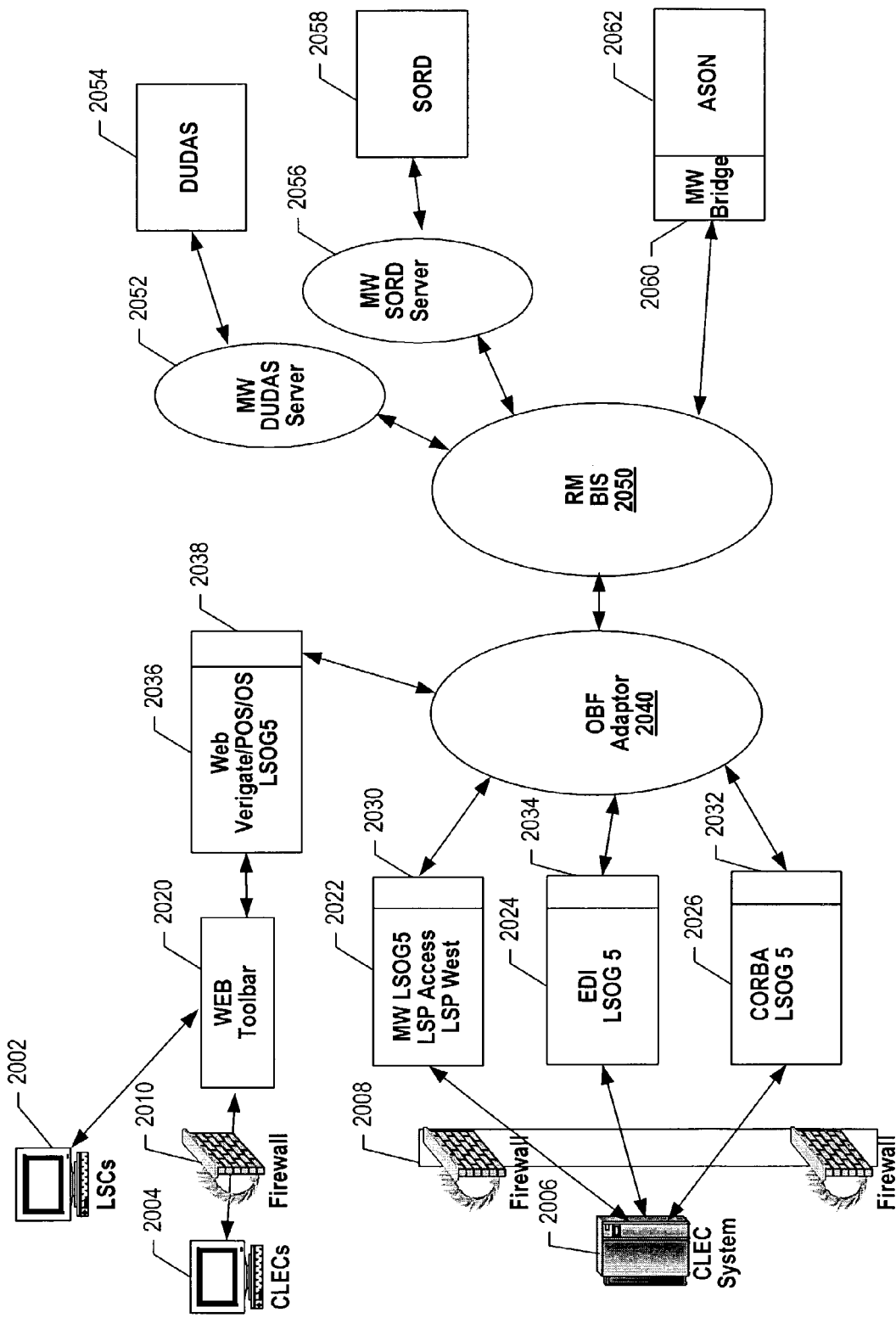

Often, when placing an order or scheduling a service, a due date must be negotiated. Actions are scheduled to properly utilize resources. FIG. 20 depicts due date negotiation. The RM BIS 2050 negotiates with various due date negotiating systems depending on the system responsible for the service. For example, in one region, a Due Date Availability Service (DUDAS) 2054 may be responsible for due date negotiations. In other regions, a Service Order Retrieval and Distribution (SORD) system 2058 or Ameritech Service Order Negotiation (ASON) system 2062 may be responsible for due date negotiation. The RM BIS 2050 may negotiate with the DUDAS system 2054 through a message-oriented middleware (MW) DUDAS server 2052. Alternately, the RM BIS 2050 may negotiate with the SORD system 2054 through a MW SORD server 2056 or an ASON system 2062 through a MW Bridge 2060. The due date may then be reported to the requestor through the OBF adaptor 2040.

Figure 21:
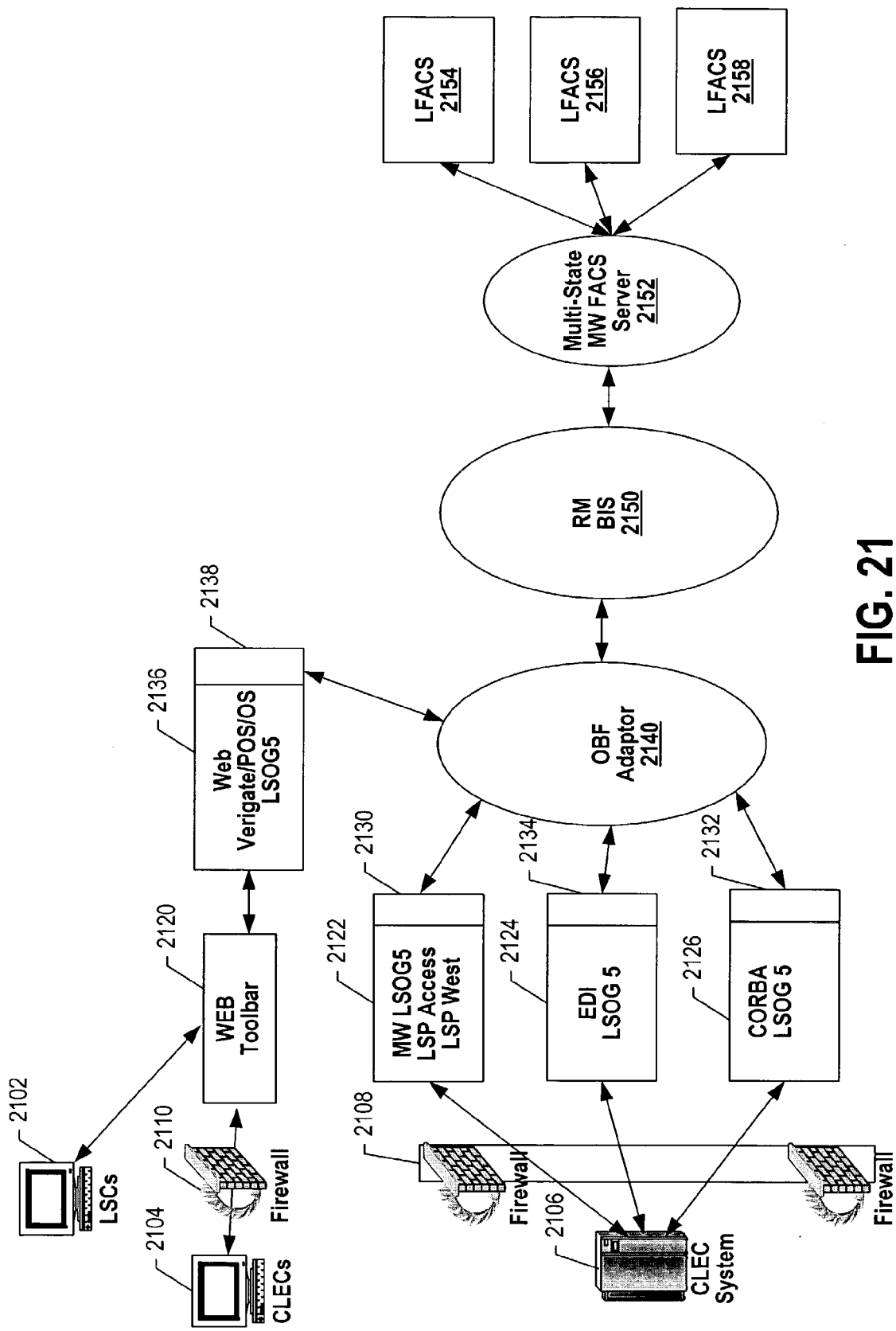

FIG. 21 depicts an exemplary system for dispatch of service. In the complex telecommunications industry, customers and competitors may have co-located equipment to which loops may be relocated or may desire service on equipment such as a switch. A dispatch may be scheduled to accomplish the service. An RM BIS 2150 accesses a multi-region MW Facilities Assignment Control System (FACS) Server 2152 that, in turn, accesses a selected Loop Facilities Assignment Control System (LFACS) server of LFACS 2154, 2156, and 2158. The result of this operation may be reported through the OBF adaptor 2140.

Figure 22:
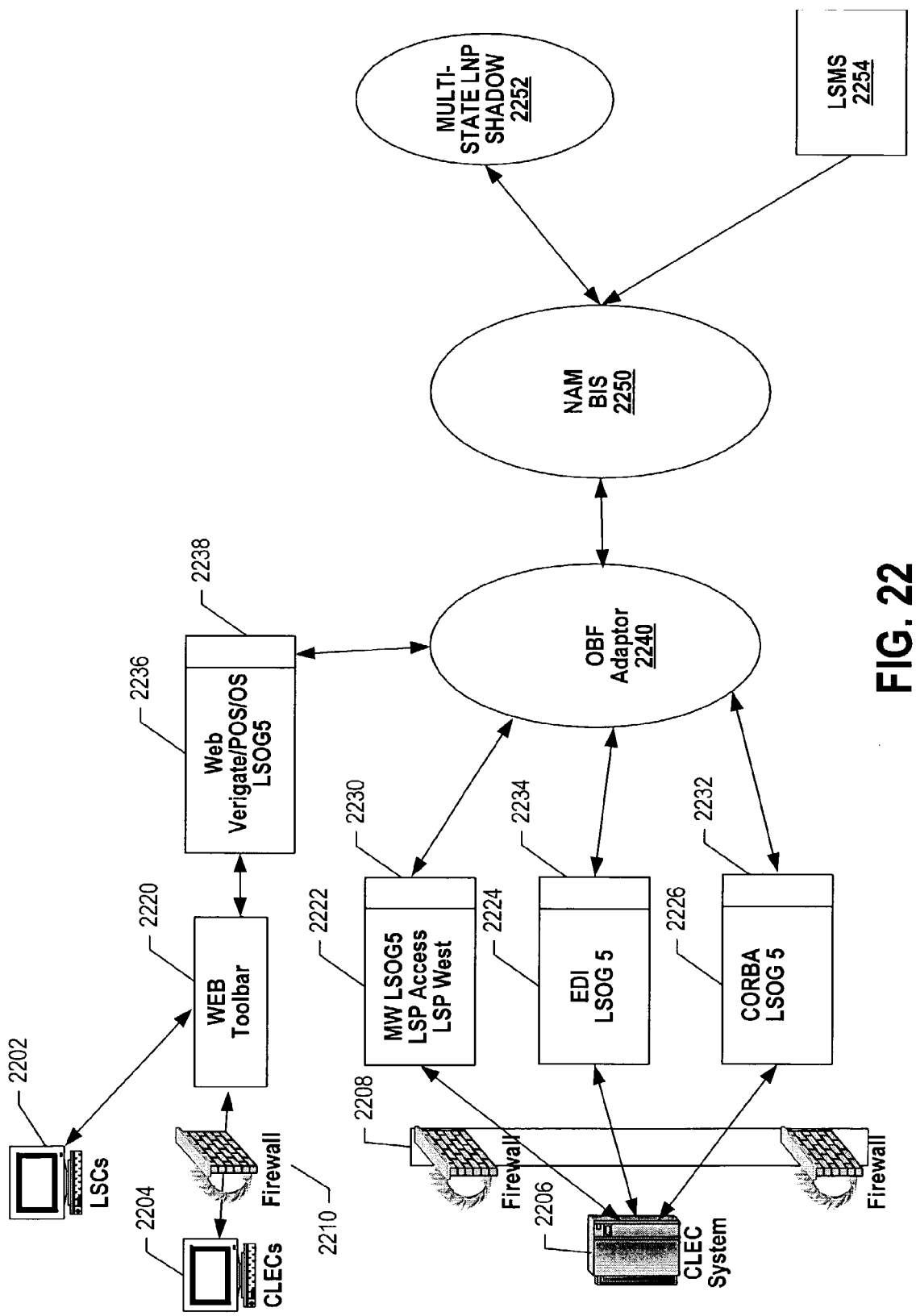

The system may be used to provide for portability of telephone numbers. In a system covering diverse resource services and regions, some regions may have a common repository for pooled telephone number (TN) data. Other regions may have a different system. In the example of FIG. 22, a NAM BIS 2250 selectively accesses either a multi-region local number portability (LNP) shadow service 2252 or a Local Service Management System (LSMS) 2254 to determine provisioning information for pooled numbers.

Figure 23:
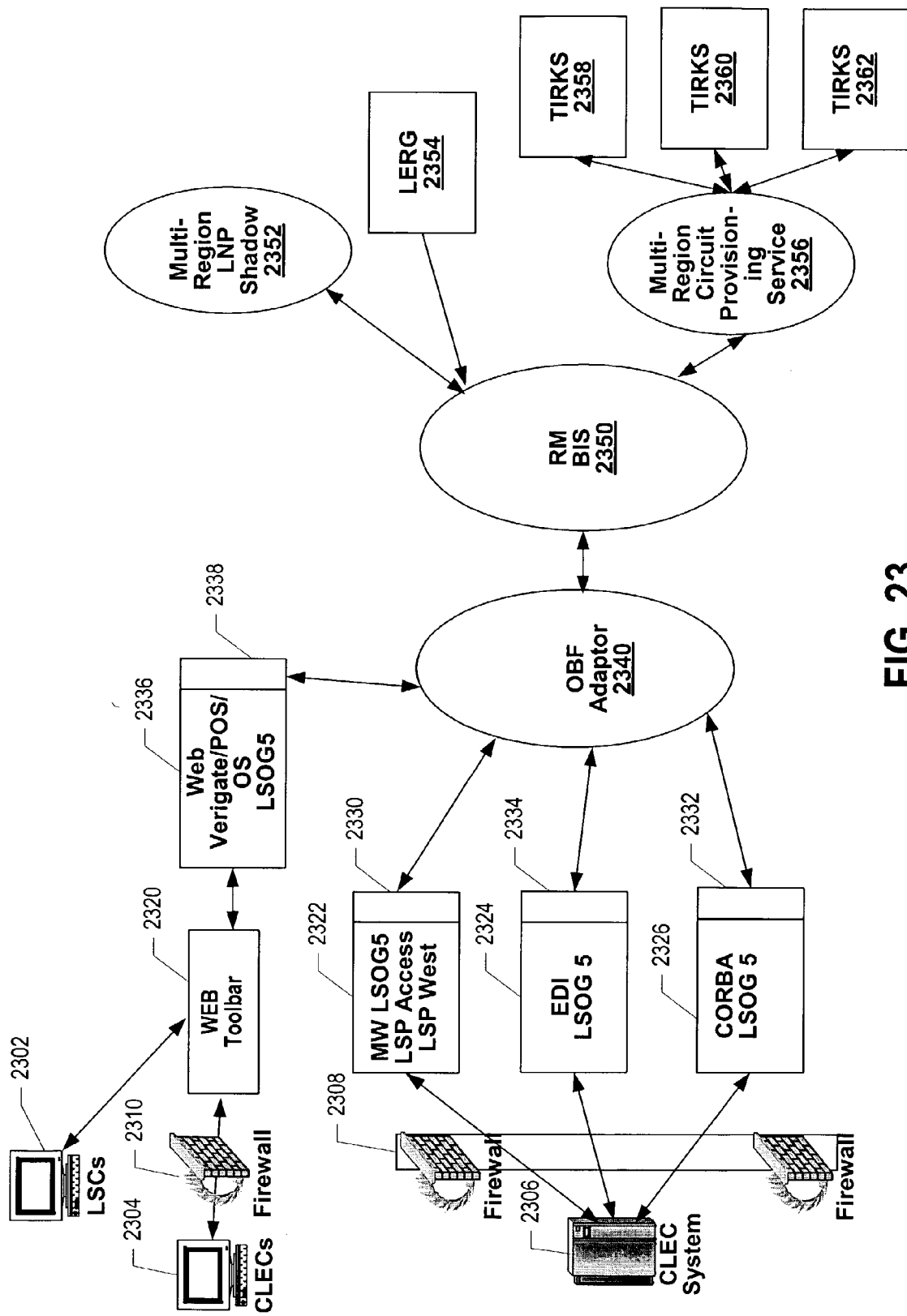

During a pre-order or order process, location of equipment affected by the order may be determined through a RM BIS 2350, as shown in FIG. 23. A Common Language Location Information (CLLI) inquiry may be made by accessing various resource systems. An LNP shadow service 2352 may be used to adjust for pooled numbers. CCLI codes may be accessed through a Local Exchange Routing Guide (LERG) 2354 or various TIRKS® systems 2358, 2360, and 2362 through a multi-region circuit provisioning service 2356 depending on which system is responsible for the associated equipment.

Figure 24:
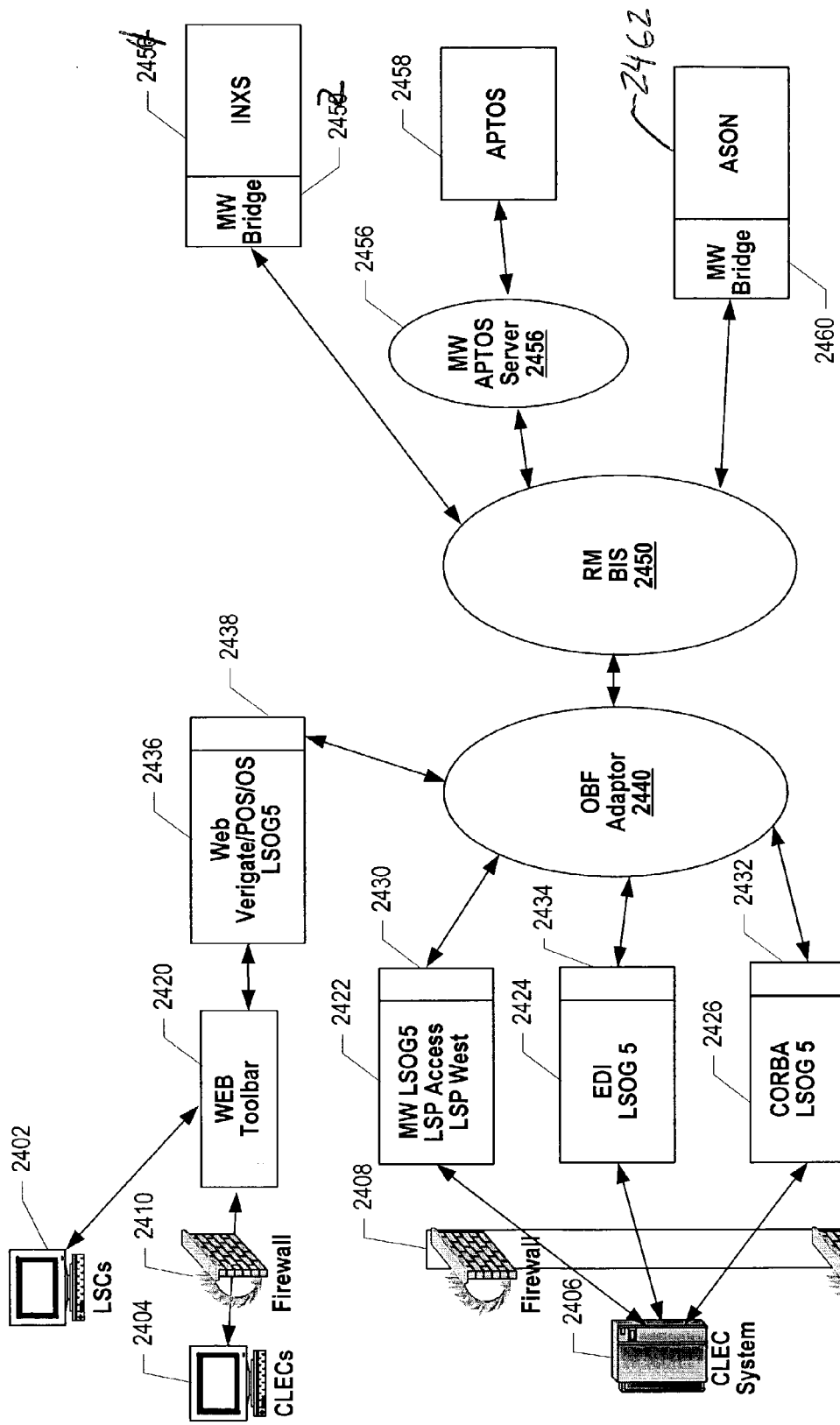

Interexchange codes for local and long distance service may be manipulated or queried with the exemplary system shown in FIG. 24. Depending on the associated region, an RM BIS 2450 may access an INXS 2454 through a MW bridge 2452, an Automated Pricing, Terminals, Options & Support (APTOS) system 2458 through a MW APTOS server 2556, or an ASON system 2462 through a MW Bridge 2460 to acquire or manipulate Primary Interexchange Codes (PICs) or Local Primary Interexchange Codes (LPICs).

Figure 25:
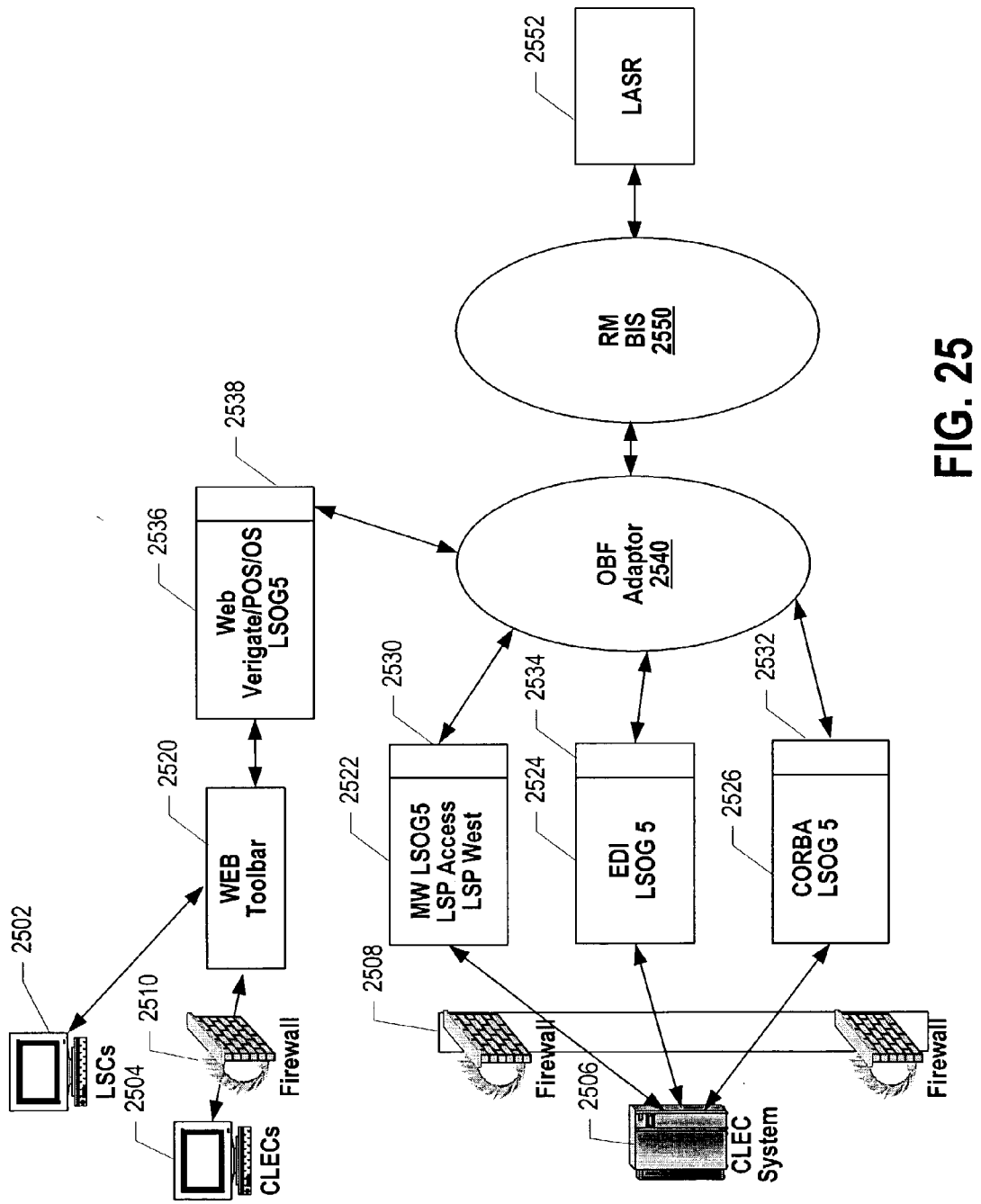

Inquiries regarding Network Channels (NC) and Network Channel Interfaces (NCI) may be made through the exemplary system shown in FIG. 25. In preparing an order, knowledge of the type of network channel and network channel interface is useful. In this exemplary embodiment, an RM BIS 2550 may access a Local Access Service Request System (LASR) 2552 to negotiate entry and processing of local service requests. The LASR 2552 may provide NC/NCI inquiry data.

Figure 26:
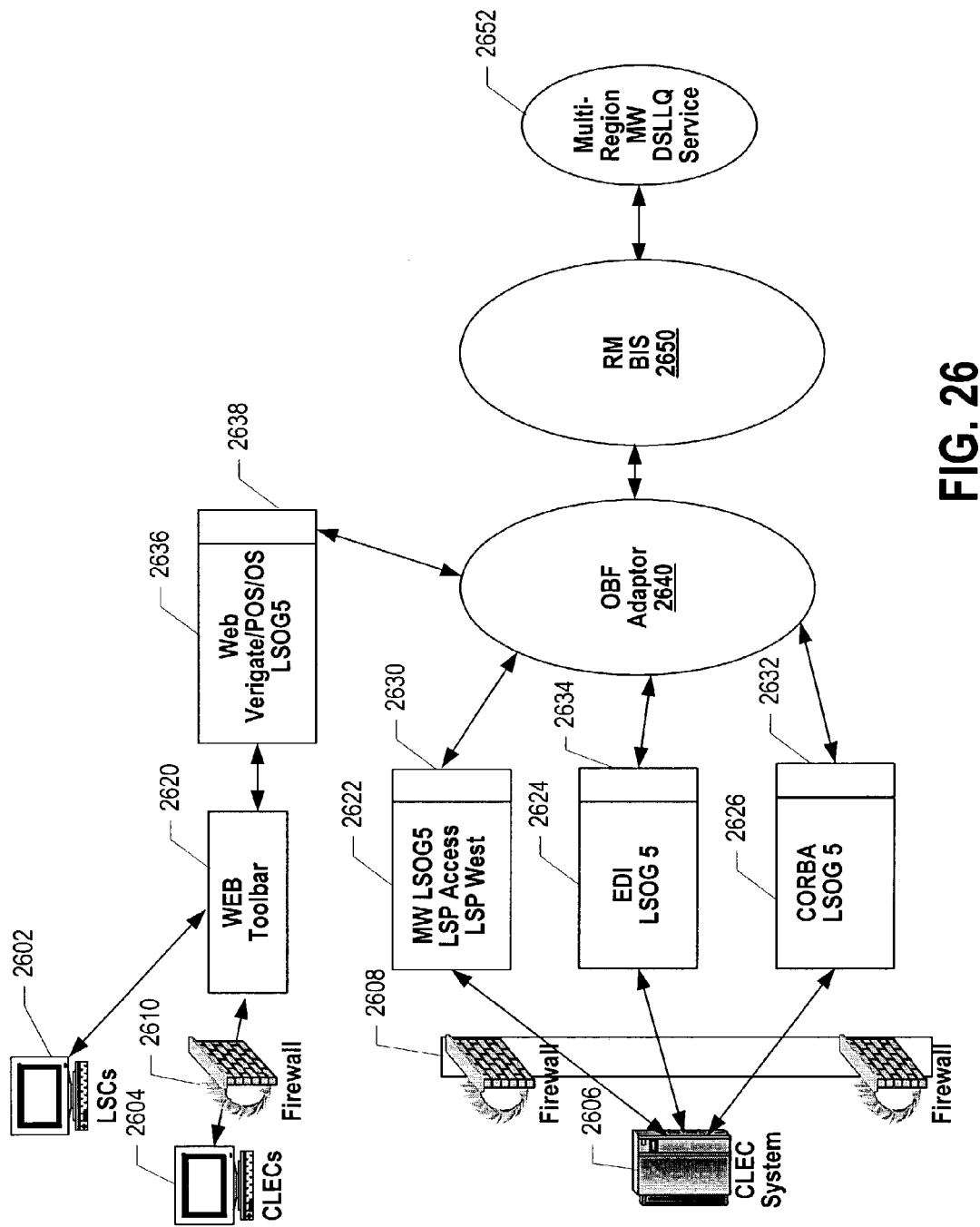

In some cases, CLECs or DSL service providers may desire loop pre-qualification prior to offering a service. FIG. 26 depicts an RM BIS 2650 accessing a multi-region MW DSL LQ service 2652 to determine loop qualification. The RM BIS 2650 may also limit loop pre-qualification if the resource systems responsible for those loops do not permit pre-qualification. Results may be sent through the OBF adaptor 2640.

Figure 27:
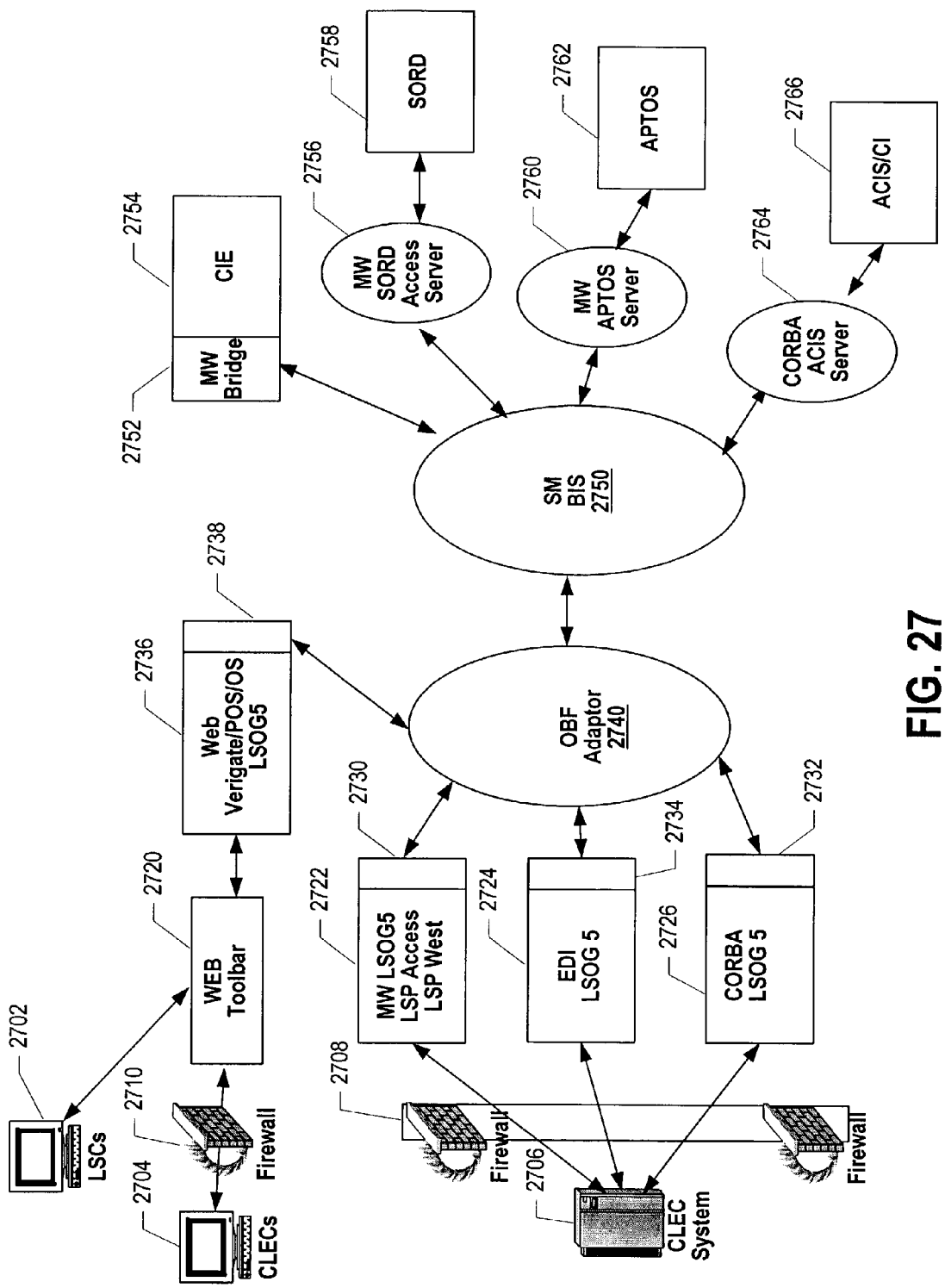

CLECs may be provided with customer service information (CSI) by an ILEC. The CSI may reside on various resource systems depending on the region and type of services. In FIG. 27, an exemplary SM BIS 2750 accesses various resource systems to acquire CSI. For example, the SM BIS 2750 may access a CRIS Information Exchange (CIE) 2754 through a MW bridge 2752, a SORD 2758 through a MW SORD server 2756, an Automated Pricing, Terminals, Options & Support (APTOS) 2762 through a MW APTOS server 2760, or an ACIS/CI system 2766 through a CORBA ACIS server 2764.

Figure 28:
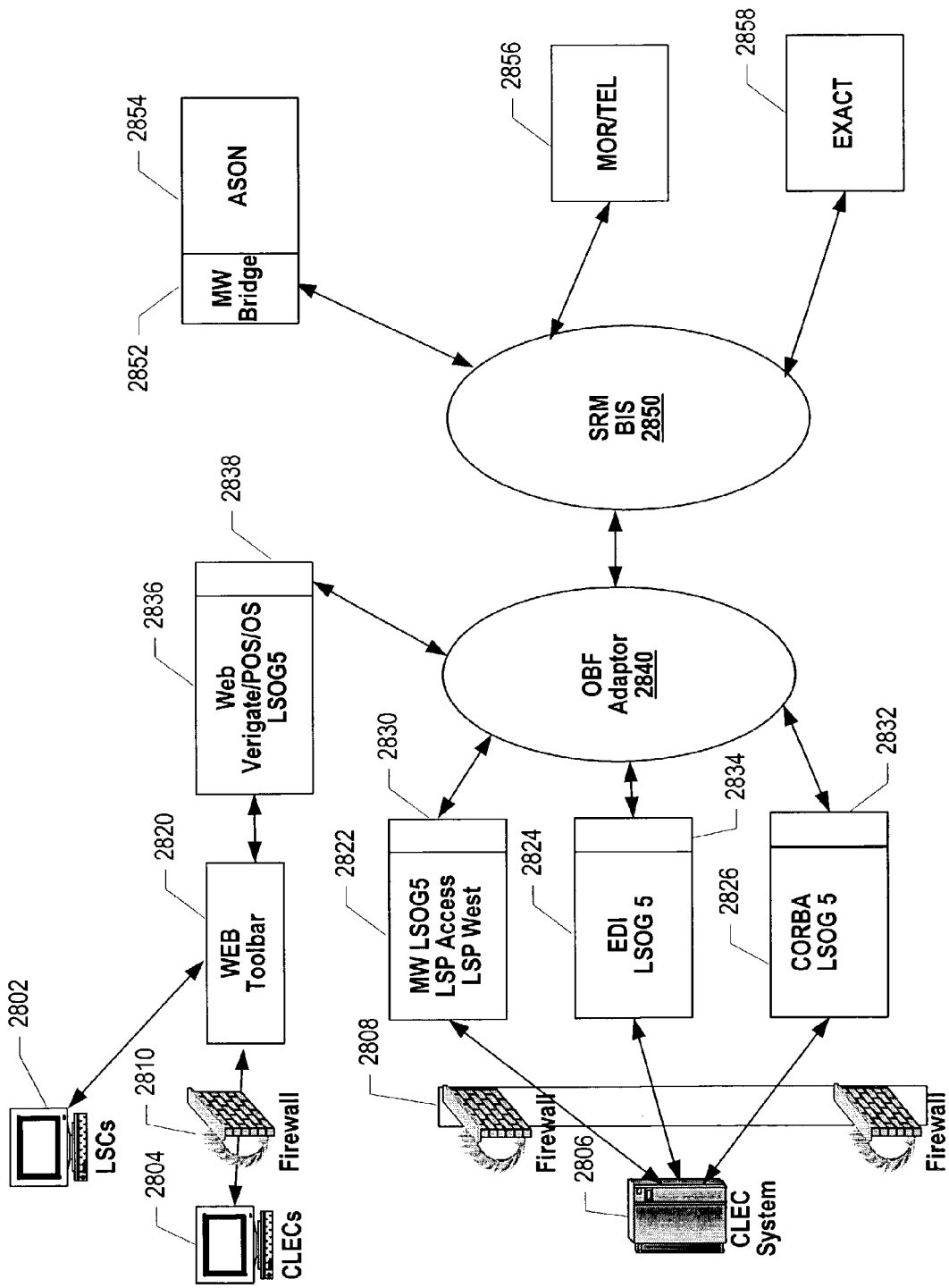
Figure 29:
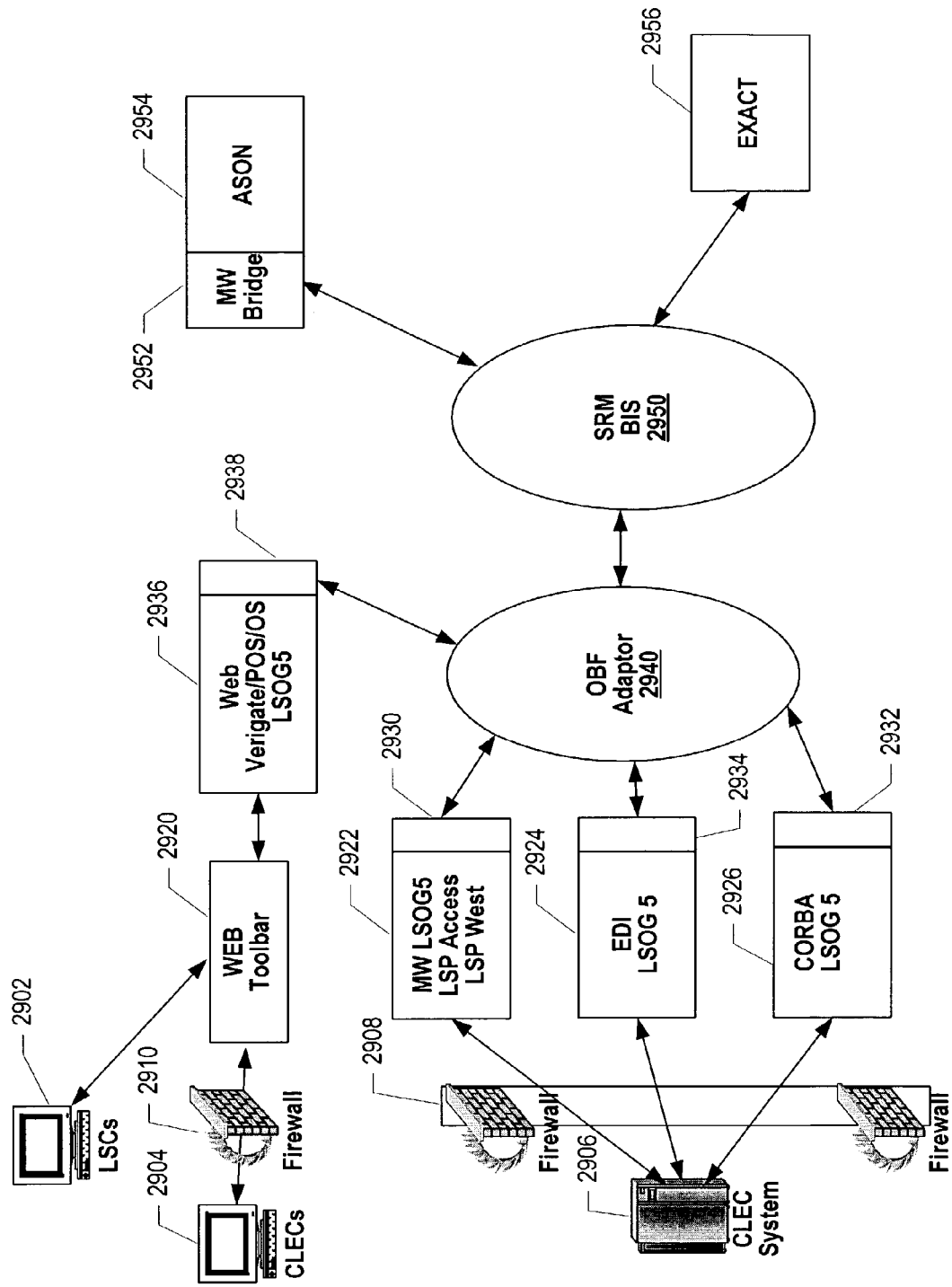
Figure 30:
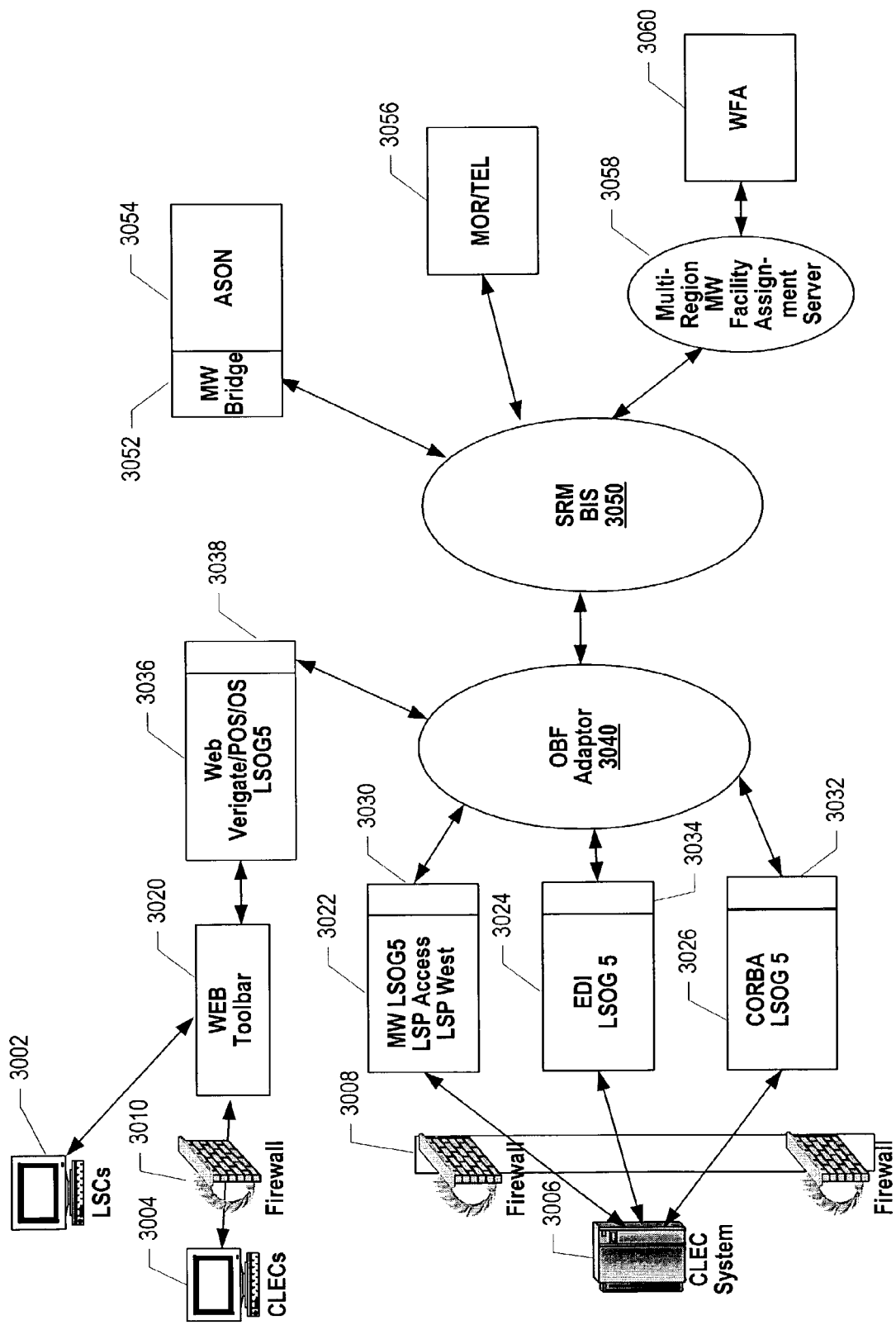
Figure 31:
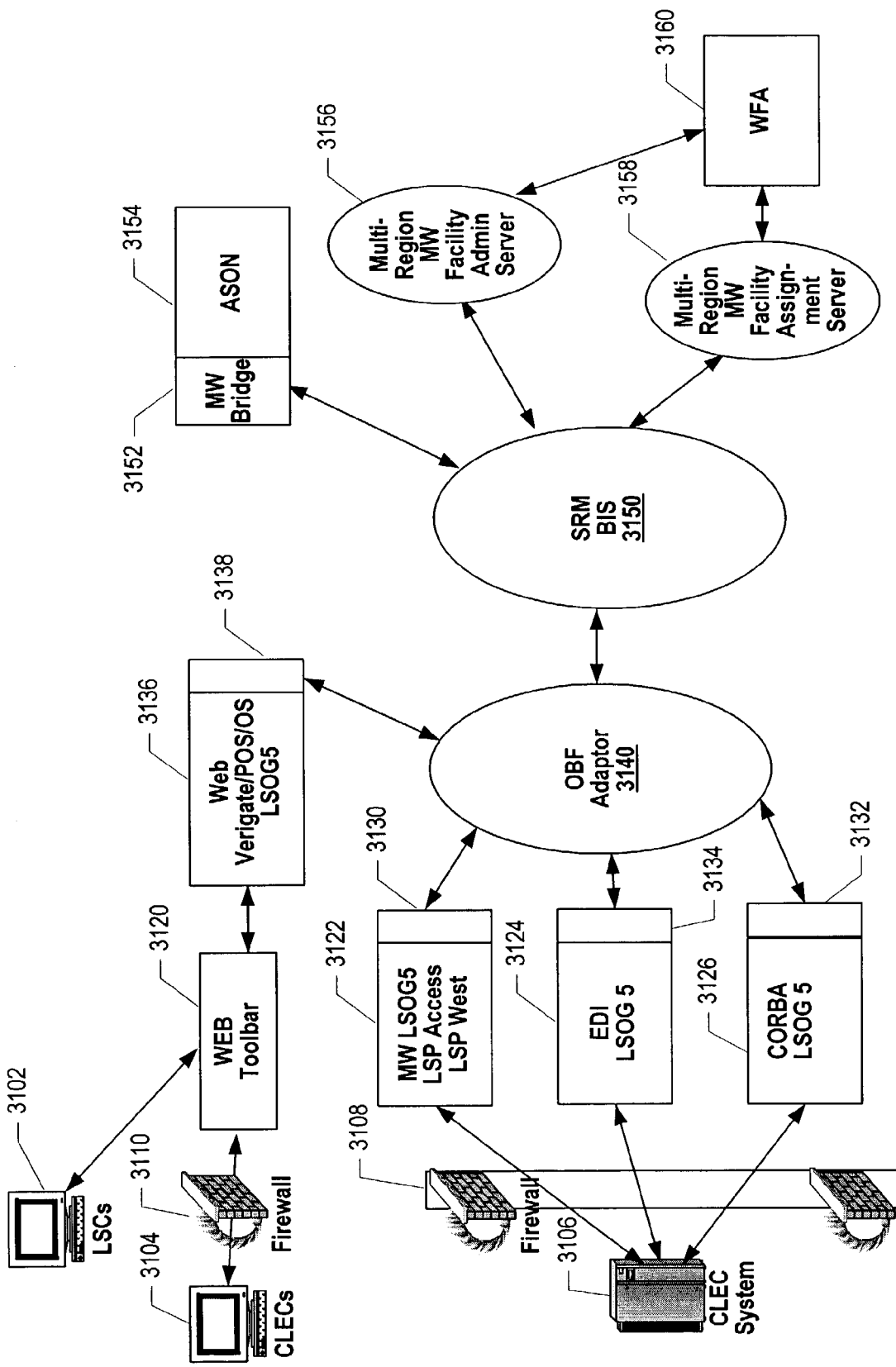

Customers and competitors accessing the system may desire order status lists and details. FIGS. 28, 29, 30 and 32 depict examples of pending/posted order and provisioning order list acquisition and detail acquisition. In FIG. 28, an SRM BIS 2850 may access ASON system 2854 through an MW bridge 2852, Mechanized Order Receipt Telecommunications (MOR/TEL) system 2856, or Exchange Access Control and Tracking System (EXACT) 2858 using associated access protocols to acquire pending/posted order lists. In FIG. 29, an SRM BIS 2950 may access the ASON System 2954 through an MW Bridge 2952 or an EXACT system 2956 to acquire order status details. In FIG. 30, SRM BIS 3050 may access ASON system 3054 through MW Bridge 3052, MOR/TEL system 3056, and Work Force Administration (WFA) system 3060 through MW Facility Assignment server 3058 to provide a list of provisioning orders. As shown in FIG. 31, provisioning order details may be accessed through the SRM BIS 3150 accessing an ASON system 3154 or a WFA system 3160 through various bridges and servers 3152, 3156, and 3158. The WFA system 3160 may be accessed through multiple servers such as the MW Work Force Administration server 3156 or the MW Facility Assignment server 3158 depending on the data being accessed.

Figure 32:
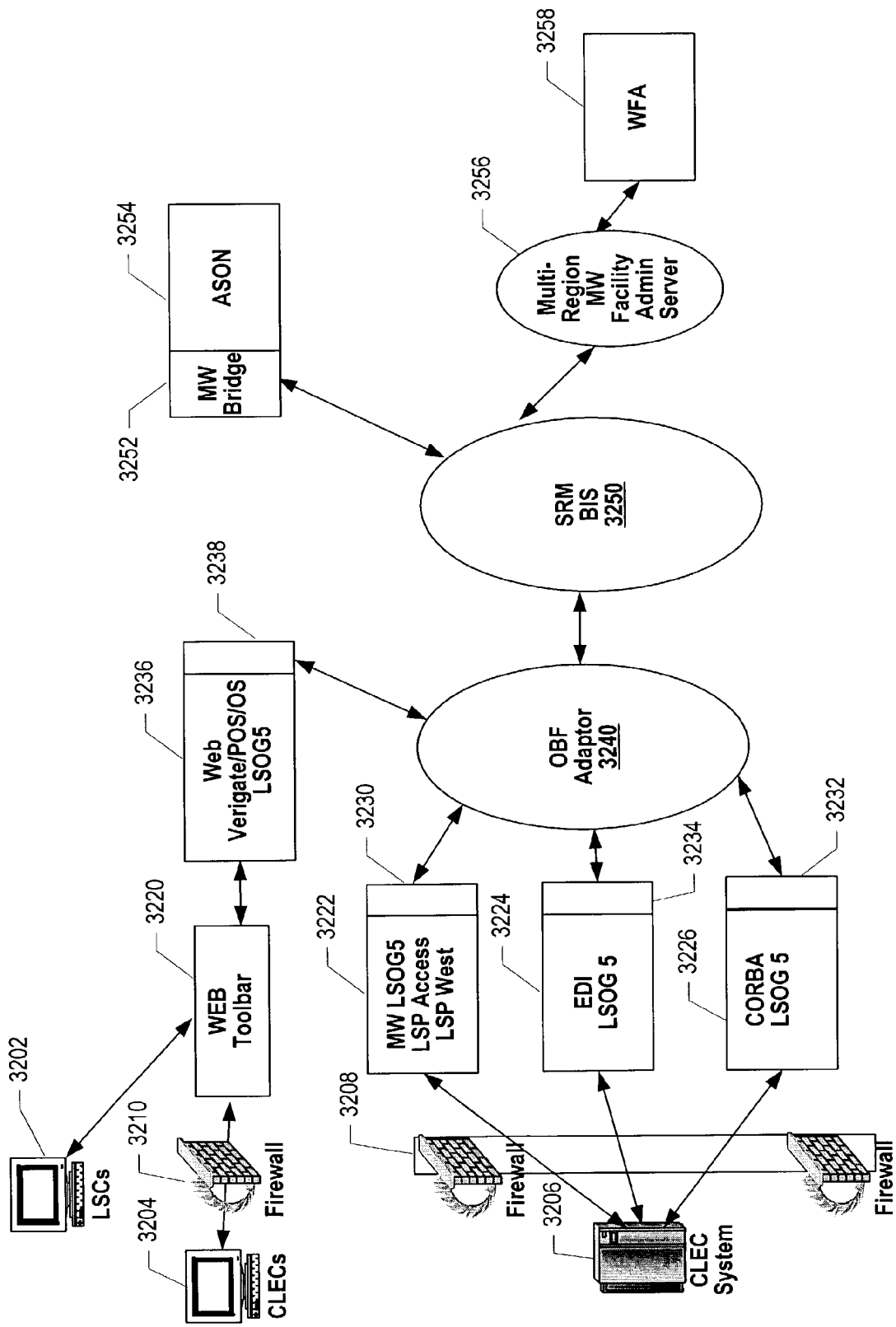

Work center workload may be provided to CLECs through an SRM BIS 3250 as shown in FIG. 32. The SRM BIS 3250 may access an ASON system 3254 through an MW Bridge 3252 or a WFA system 3258 through a multi-region MW Work Force Administration server 3256.

Figure 33:
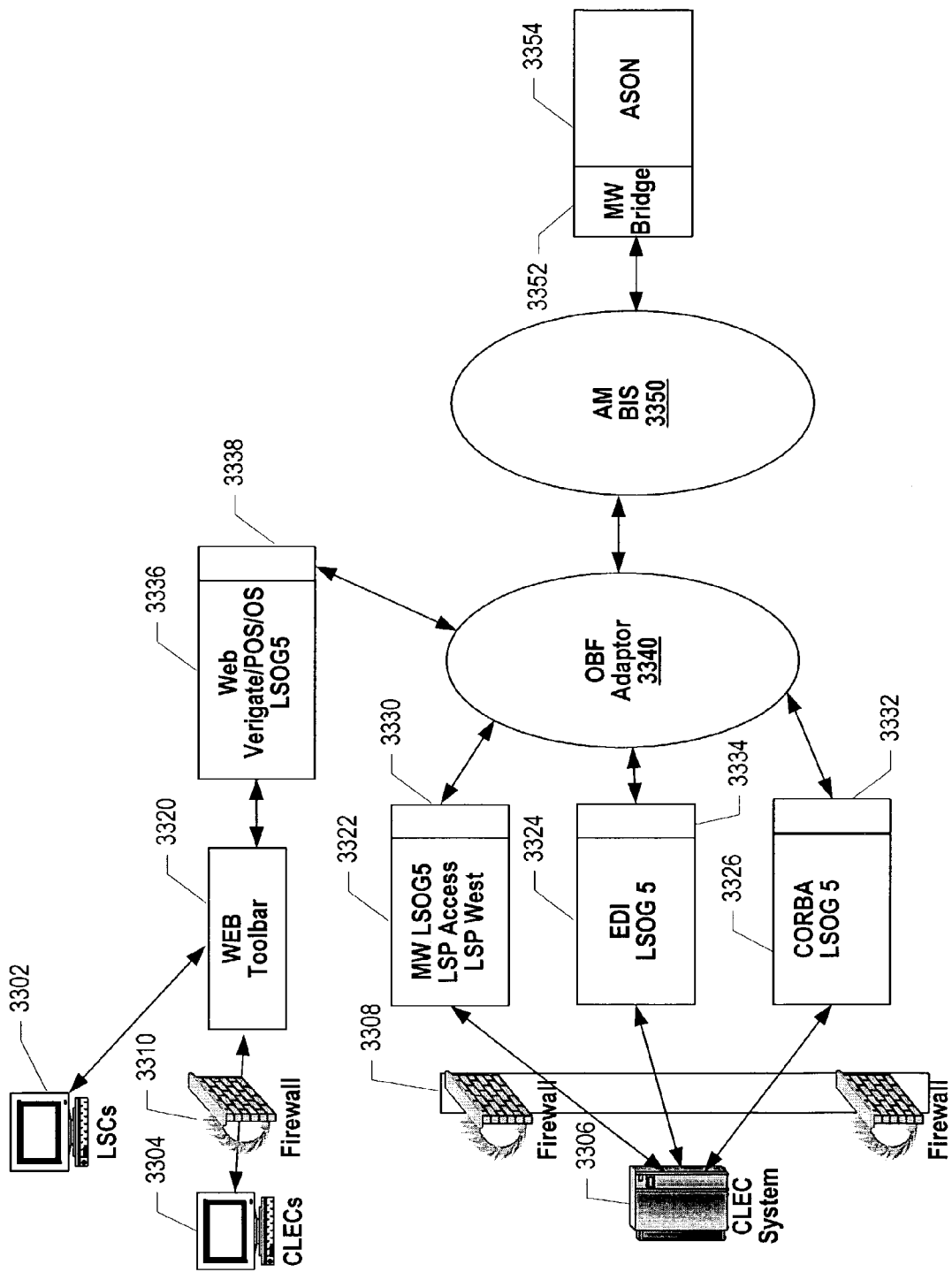

Feature availability information may be provided through an AM BIS 3350 shown in FIG. 33. The AM BIS 3350 may have access to local stored information or may access legacy systems such as ASON 3354 through MW Bridge 3352. Alternately, the AM BIS 3350 may access legacy systems through a multi-region MW server. Generally, BIS services may have some information in a local storage and other information is accessible through legacy systems.

Figure 34:
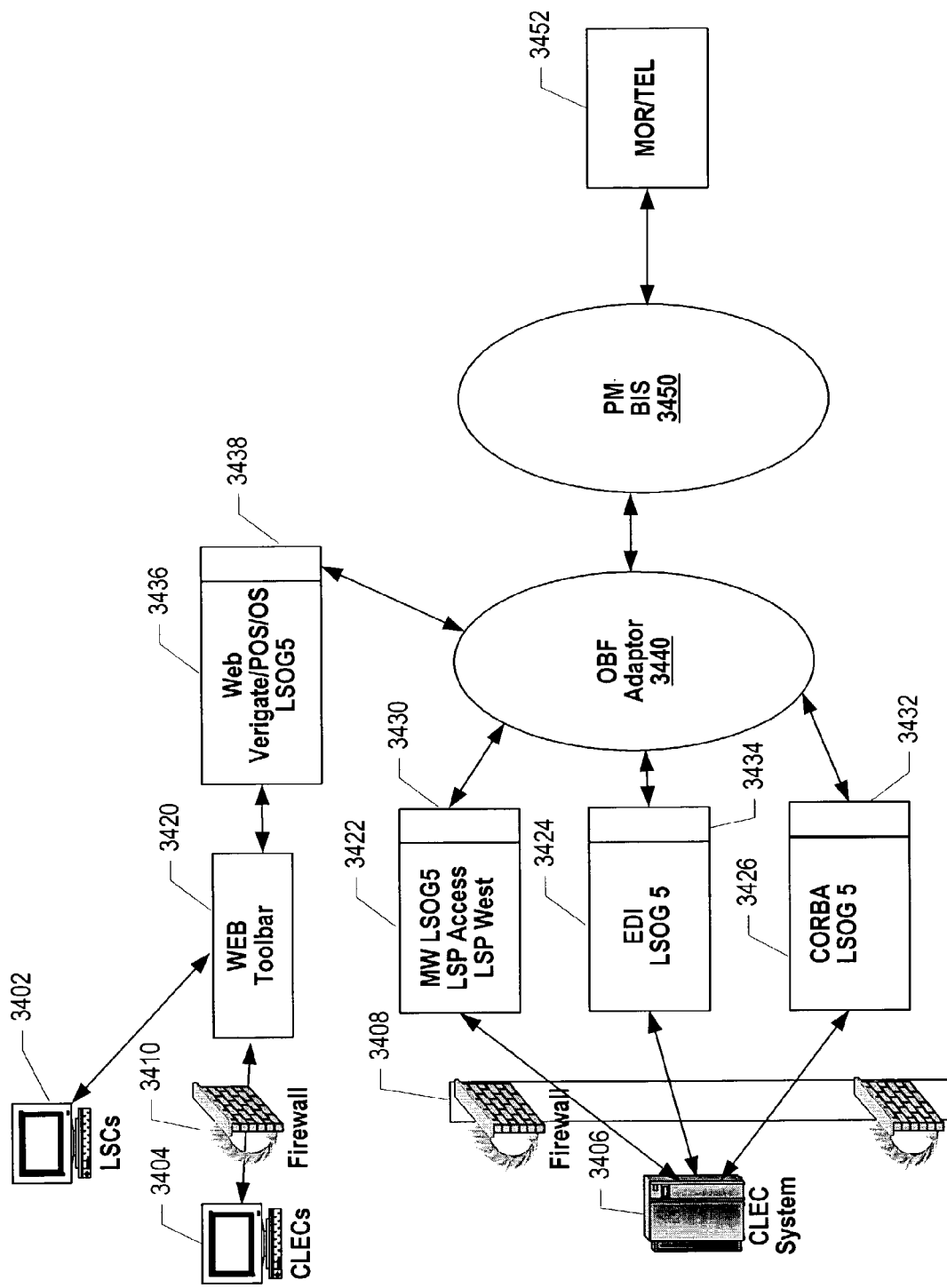

Large telecommunications companies offer many products. These products may vary by region. Merging companies may have differing codes referencing these products. As shown in FIG. 34, a PM BIS 3450 may store some of this information or may access other systems such as Mechanized Order Receipt Telemanagement (MOR/TEL) system 3452 to translate Universal Service Order Codes and Feature Identification.

Figure 35:
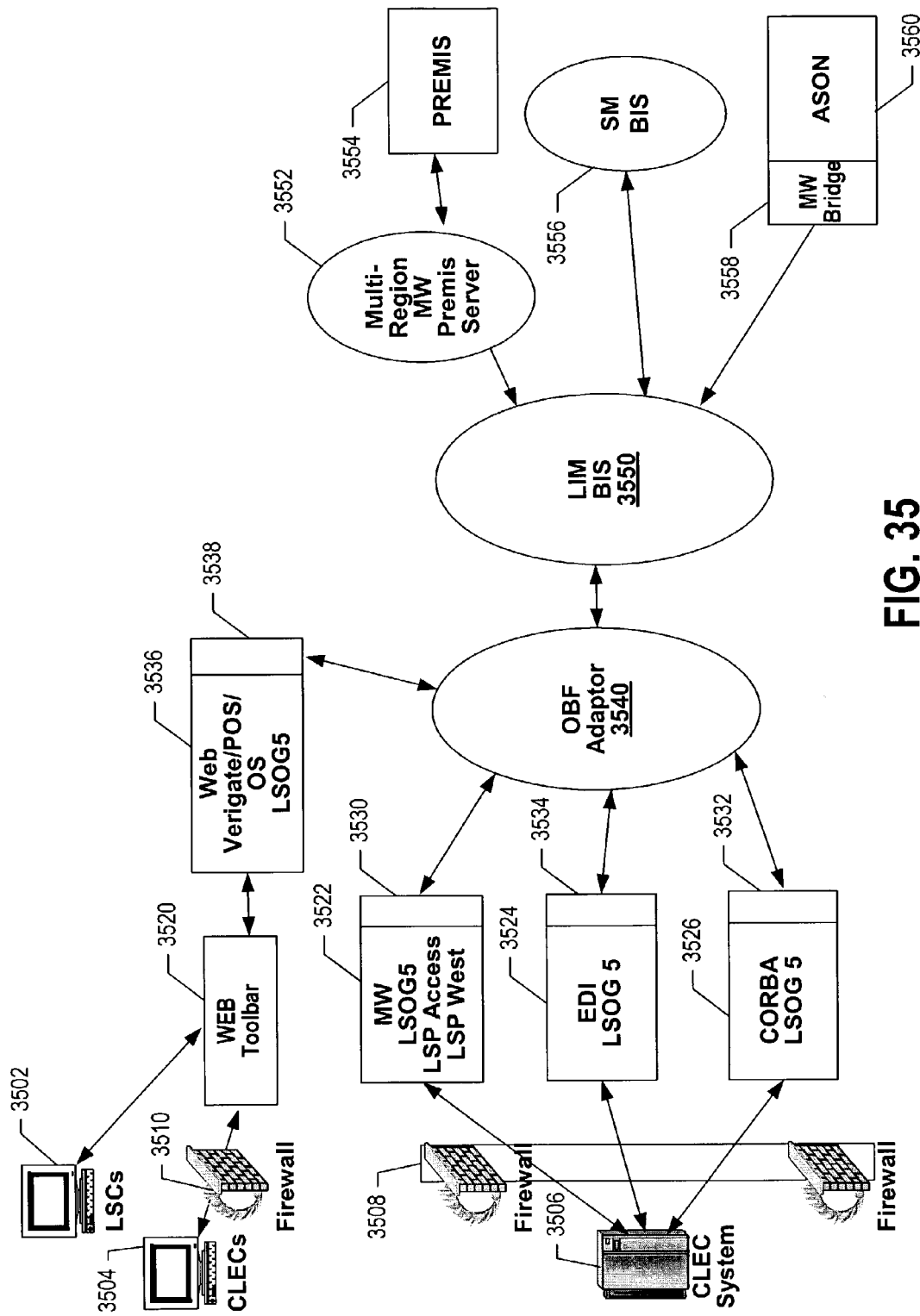
Figure 36:
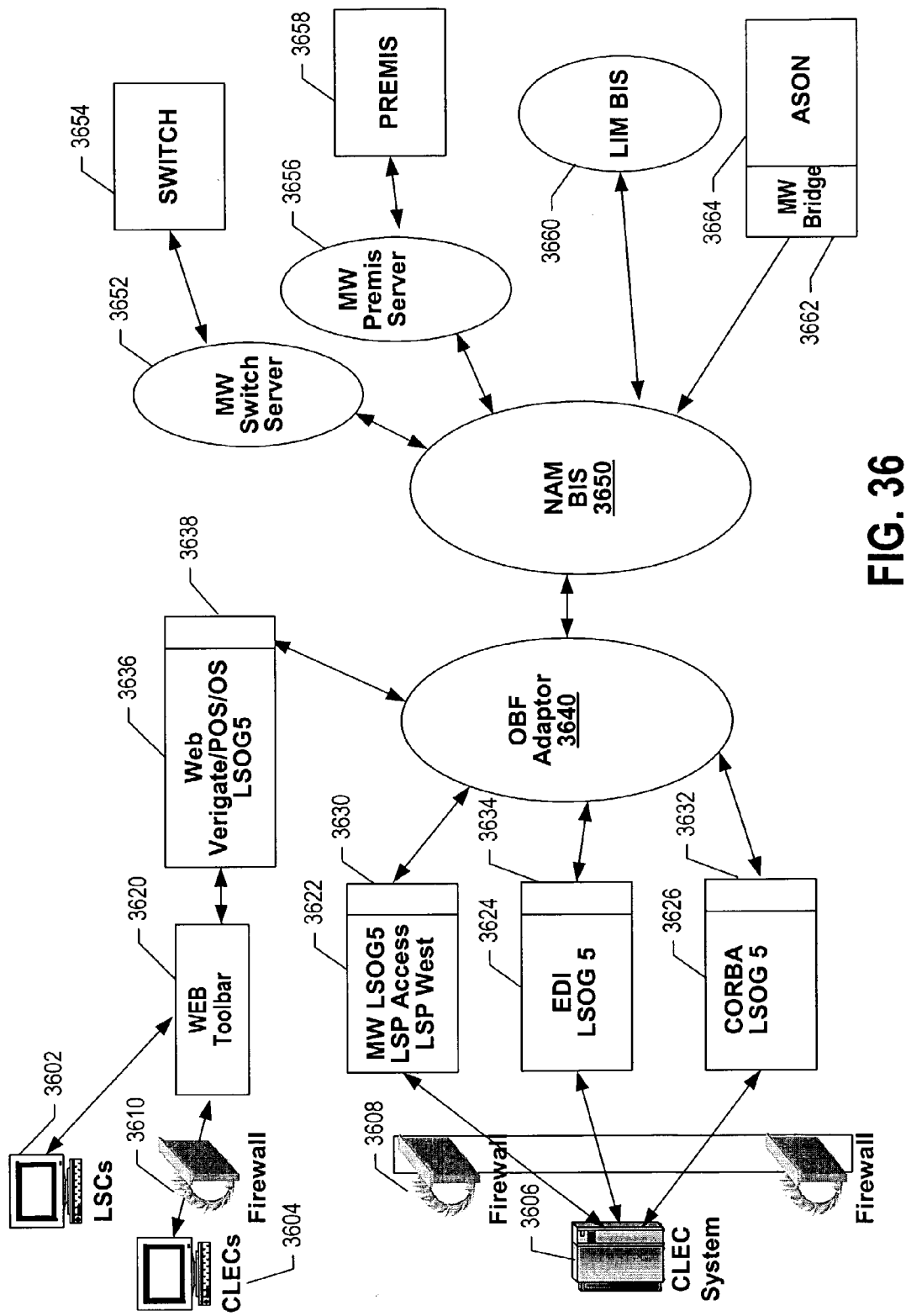
Figure 37:
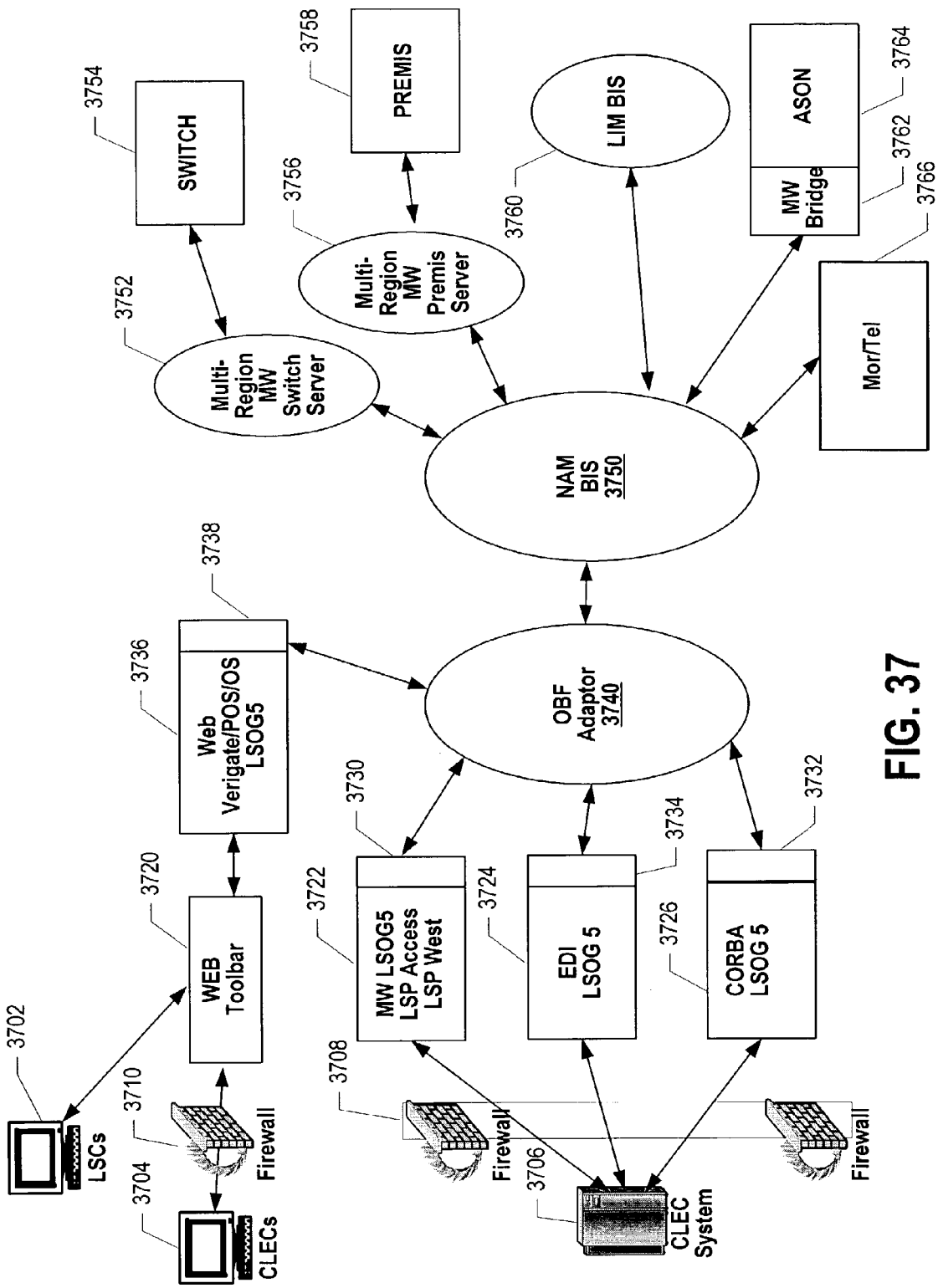

Other services such as acquiring address information through working telephone numbers may be provided by accessing resource systems or cross accessing other BIS services. FIG. 35 depicts an LIM BIS 3550 accessing various legacy systems 3554 and 3560 as well as SM BIS 3556.

Figure 38:
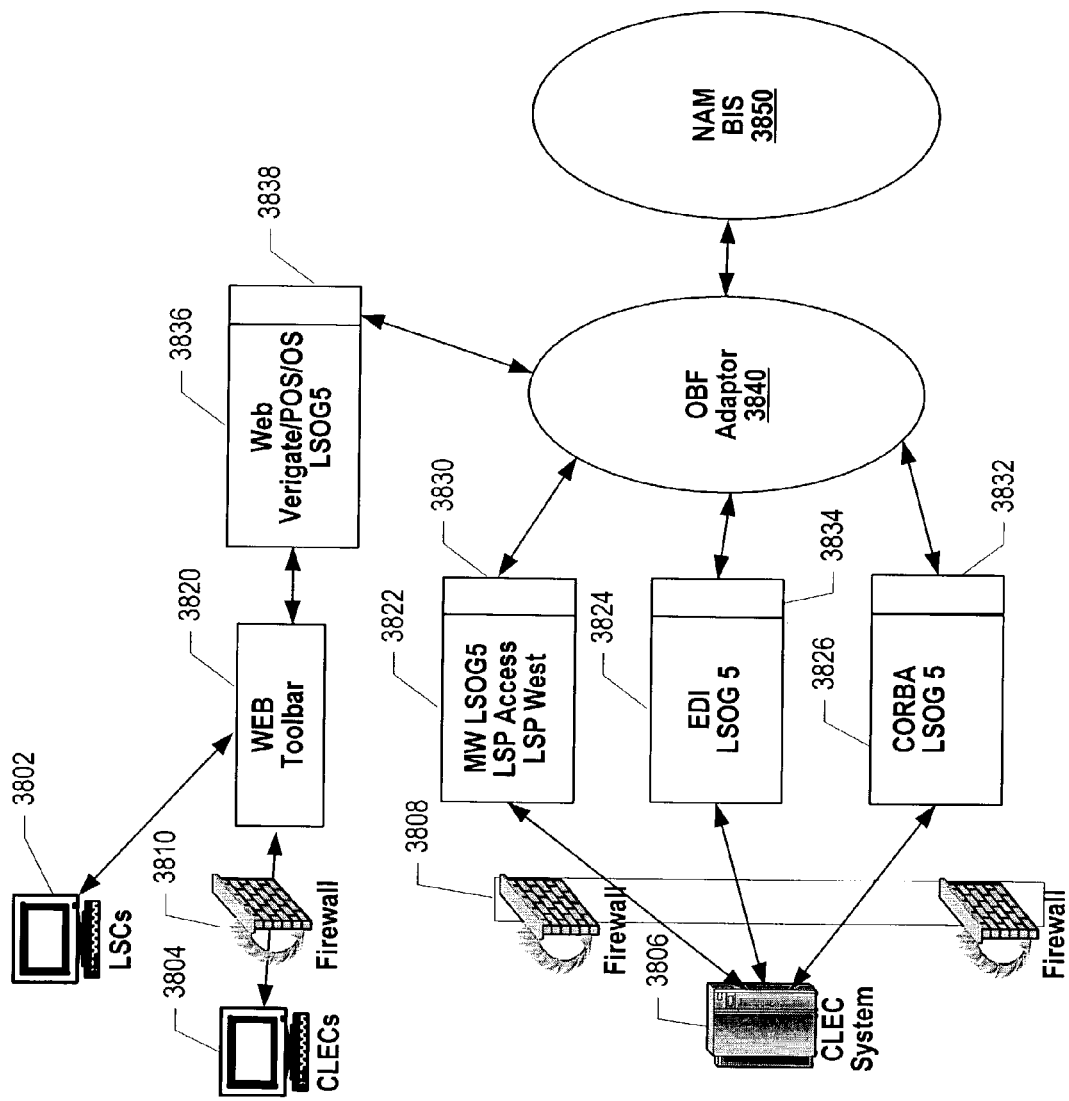
Figure 39:
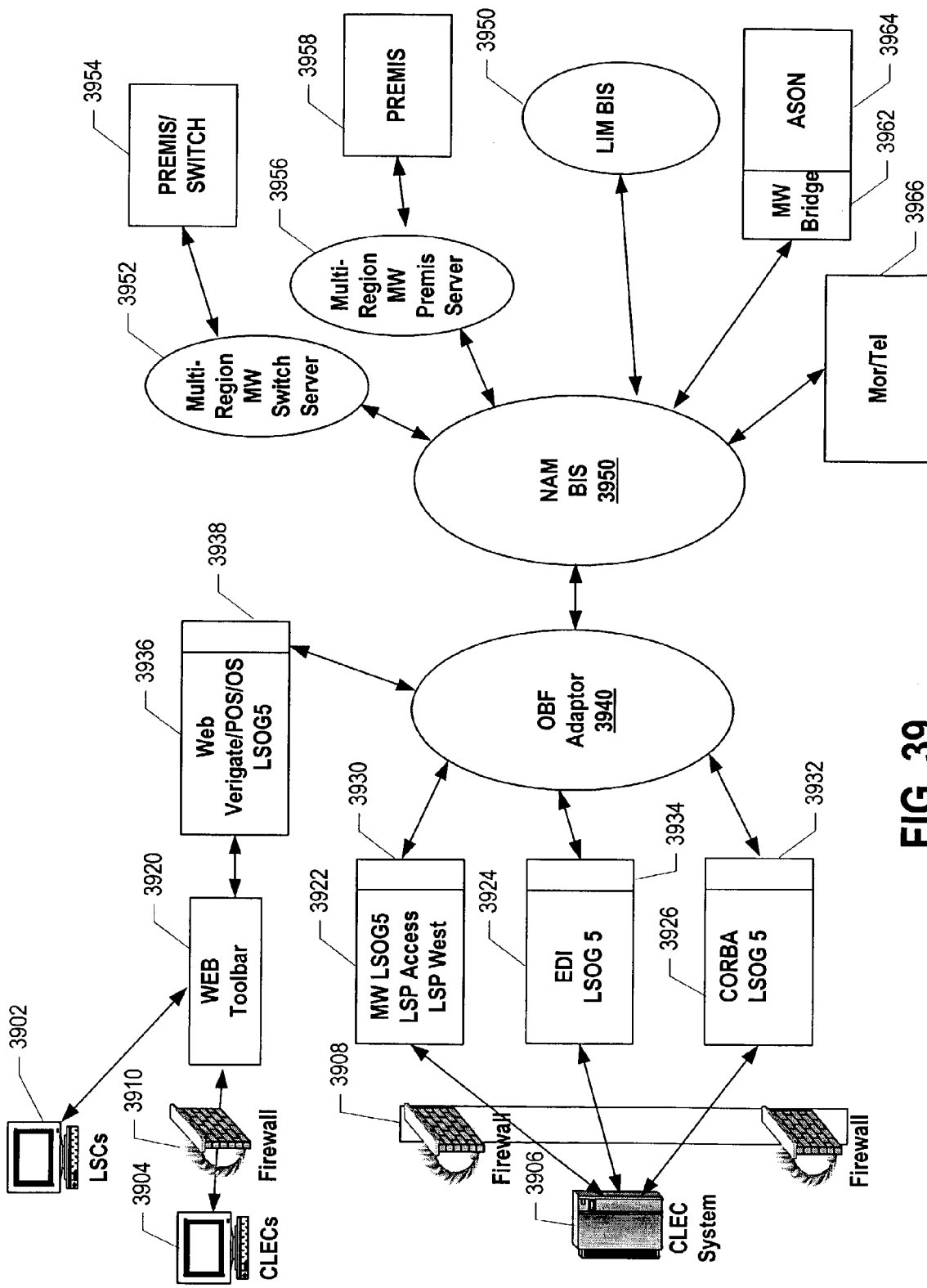

Determining a telephone number (TN) is another pre-order function. FIGS. 36, 37, 38, and 39 depict exemplary systems for telephone number inquiry, reservation, confirmation, and cancellation. A NAM BIS 3650 in FIG. 36 may access an LIM BIS 3660 to acquire Street Address Guide (SAG) information. The NAM BIS 3650 may also access various PREMIS/SWITCH systems 3654, PREMIS systems 3658, and ASON systems 3664 to provide information on a requested number. A reservation for a telephone number may be made through a NAM BIS 3750 shown in FIG. 37. The NAM BIS 3750 may persist and hold on to the reserved telephone number until it receives a confirmation. As seen in FIG. 38, a confirmation from a customer or CLEC of an acquired number associated with a reservation may be handled by the NAM BIS 3850. On the other hand, a customer or CLEC may cancel a telephone number (TN) reservation, as seen in FIG. 39. The NAM BIS 3950 may access the resource systems and other BIS systems to facilitate the cancellation.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A distributed computer system in support of telecommunication operations, the distributed computer system comprising:

a telecommunications related application service adapted to receive customer service requests via a plurality of communication interfaces;

a server system having processing logic and memory accessible to the processing logic, wherein the memory stores an integration services application that includes:

an interface layer including a plurality of communication adapters;

a logic layer including a first interface and having access to a rules engine;

an object layer including a second interface, a transformation service, and an object; and a resource layer including a plurality of resource interface modules, at least one of the plurality of resource interface modules having access to a plurality of diverse resource systems, at least one of the plurality of resource interface modules configured to receive a first data item from one of the plurality of diverse resource systems, wherein the transformation service is adapted to transform the first data item into the object, and wherein the logic layer has access to the object and is adapted to provide a second data item to the telecommunications related application service through at least one of the plurality of communication interfaces;

wherein the interface layer, the logic layer, the object layer and the resource layer are integrated via a plurality of reusable infrastructure modules; and wherein the telecommunications related application service communicates with the integration services application via a plurality of infrastructure interfaces adapted to access the plurality of reusable infrastructure modules.

2. The distributed computer system of claim 1, wherein the plurality of communication adapters are coupled to an application service, the application service accessible from a plurality of access channels.

3. The distributed computer system of claim 1, wherein the second data item represents usage data.

4. The distributed computer system of claim 1, wherein the second data item represents an address validation response.

5. The distributed computer system of claim 1, wherein the second data item represents a telephone number allocation.

6. The distributed computer system of claim 1, wherein the second data item represents customer information.

7. The distributed computer system of claim 1, wherein at least one of the plurality of diverse resource systems is a business support system.

8. The distributed computer system of claim 1, wherein at least one of the plurality of diverse resource systems is a regionally distributed trunk inventory management system.

9. The distributed computer system of claim 1, wherein the customer requests relate to address validation.

10. The distributed computer system of claim 1, wherein the customer requests relate to channel facility assignment.

11. The distributed computer system of claim 1, wherein the communication is associated with a telecommunications pre-ordering function.

12. The distributed computer system of claim 1, wherein the communication is associated with at least one of due date negotiation, dispatch facilitation, telephone number (TN) pooling, common language location information (CLLI) inquiry, primary interexchange code (PlC) and local primary interexchange code (LPIC) reference, network channel (NC) and network channel interface (NCI) inquiry, customer service information (CSI) access, pending/poster order lists and details, provisioning order lists and details, and bulk workload assessment.

13. The distributed computer system of claim 1, wherein the communication is associated with loop qualification.

14. The distributed computer system of claim 1, wherein the communication is associated with at least one of feature availability inquiry, universal service order code (USOC) and feature ID (FID) lookup, address inquiries by working telephone number (WTN), telephone number (TN) inquiries, telephone number (TN) reservation, telephone number (TN) confirmation, telephone number (TN) cancellation, and channel facility assignment (CFA) inquiries.

15. The distributed computer system of claim 1, further comprising a plurality of interconnection services at a plurality of different computing nodes providing access to the telecommunications related application services, wherein the plurality of interconnection services are separated from a global network by a firewall.

* * * * *